US011493955B2

(12) United States Patent
Ha et al.

(10) Patent No.: US 11,493,955 B2
(45) Date of Patent: Nov. 8, 2022

(54) ELECTRONIC DEVICE INCLUDING FRONT PLATE SLIDABLE IN BOTH DIRECTIONS

(71) Applicant: Samsung Electronics Co., Ltd., Gyeonggi-do (KR)

(72) Inventors: Dohyung Ha, Gyeonggi-do (KR); Wonseok Oh, Gyeonggi-do (KR); Saewon Kwon, Gyeonggi-do (KR); Kisung Kim, Gyeonggi-do (KR); Sangkyu Park, Gyeonggi-do (KR); Junghyuck Im, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 16/937,725

(22) Filed: Jul. 24, 2020

(65) Prior Publication Data

US 2021/0026408 A1 Jan. 28, 2021

(30) Foreign Application Priority Data

Jul. 26, 2019 (KR) .......................... 10-2019-0091083

(51) Int. Cl.
  *G06F 1/16* (2006.01)
(52) U.S. Cl.
  CPC .......... *G06F 1/1624* (2013.01); *G06F 1/1605* (2013.01); *G06F 1/1626* (2013.01); *G06F 1/1637* (2013.01); *G06F 1/1686* (2013.01)
(58) Field of Classification Search
  CPC .... G06F 1/1624; G06F 1/1605; G06F 1/1626; G06F 1/1637; G06F 1/1686;

(Continued)

(56) References Cited

U.S. PATENT DOCUMENTS

2007/0275773 A1\* 11/2007 Joung ................. H04M 1/0235
  455/575.1
2008/0125200 A1\* 5/2008 Park .................... H04M 1/0237
  455/575.4

(Continued)

FOREIGN PATENT DOCUMENTS

CN 207910858 U 9/2018
CN 207926660 U 9/2018

(Continued)

OTHER PUBLICATIONS

International Search Report dated Nov. 11, 2020.
European Search Report dated Dec. 3, 2020.

*Primary Examiner* — Lester G Kincaid
*Assistant Examiner* — Maryam Soltanzadeh
(74) *Attorney, Agent, or Firm* — Cha & Reiter, LLC

(57) ABSTRACT

An electronic device according to an embodiment includes: a front plate facing a first direction; a rear plate facing a second direction opposite to the first direction; and a support member including a first camera and a second camera, and disposed between the front plate and the rear plate, and, when the front plate slides in a third direction in a first state in which the first camera is occluded by the front plate and the second camera is occluded by the rear plate, the electronic device is configured into a second state in which the first camera is visible, and when the front plate slides in a fourth direction opposite to the third direction in the first state, the support member is configured to slide along with the front plate and the electronic device is configured into a third state in which the second camera is visible.

20 Claims, 17 Drawing Sheets

(58) Field of Classification Search
CPC .. G06F 1/1652; G06F 1/1628; H04M 1/0237; H04M 1/0247; H04M 1/0264; H04M 1/0235; H04M 1/0268; H04M 1/026
See application file for complete search history.

(56) References Cited

U.S. PATENT DOCUMENTS

| | | | |
|---|---|---|---|
| 2012/0165073 A1 | 6/2012 | Griffin | |
| 2018/0205809 A1* | 7/2018 | Luo | H04M 1/0266 |
| 2018/0307269 A1 | 10/2018 | Pantel | |
| 2018/0307270 A1 | 10/2018 | Pantel | |
| 2019/0116248 A1* | 4/2019 | Chen | H04M 1/0237 |
| 2019/0253541 A1* | 8/2019 | Fan | H04N 1/00307 |
| 2020/0177773 A1* | 6/2020 | Yoo | H04M 1/0264 |

FOREIGN PATENT DOCUMENTS

| | | |
|---|---|---|
| CN | 207926664 U | 9/2018 |
| CN | 109167852 A | 1/2019 |
| CN | 109672762 A | 4/2019 |
| CN | 209105285 U | 7/2019 |
| EP | 3525437 A1 | 8/2019 |
| JP | 2007-274727 A | 10/2007 |

\* cited by examiner

ELECTRONIC DEVICE INCLUDING FRONT PLATE SLIDABLE IN BOTH DIRECTIONS

CROSS-REFERENCE TO RELATED APPLICATION(S)

This application is based on and claims priority under 35 U.S.C. § 119 to Korean Patent Application No. 10-2019-0091083, filed on Jul. 26, 2019, in the Korean Intellectual Property Office, the disclosure of which is herein incorporated by reference in its entirety.

BACKGROUND

Field

One or more embodiments of the instant disclosure generally relate to an electronic device including a front plate slidable in both directions.

Description of Related Art

As digital technology has developed, various types of electronic devices such as mobile communication terminals, smartphones, tablet personal computers (PCs), electronic schedulers, personal digital assistants (PDAs), wearable devices, or the like are widely used. These electronic devices may each include a display for providing information and at least one sensor including a camera for acquiring imaging information from the surroundings of the electronic devices.

The above information is presented as background information only to assist with an understanding of the disclosure. No determination has been made, and no assertion is made, as to whether any of the above might be applicable as prior art with regard to the disclosure.

SUMMARY

An electronic device such as a smartphone may include at least one sensor (for example, an illumination sensor, a camera, etc.) disposed on the periphery of a display seen through a front plate or disposed within the display. The at least one sensor may reduce visibility of information displayed on the display.

The technical object to be achieved by the disclosure is not limited to that mentioned above, and other technical objects that are not mentioned above may be clearly understood to those skilled in the art based on the description provided below.

An electronic device according to one or more embodiments may include: a front plate facing a first direction and including a display; a rear plate facing a second direction opposite to the first direction; and a support member including a first camera facing the first direction and a second camera facing the second direction, and disposed between the front plate and the rear plate, and, when the front plate slides in a third direction with respect to the support member in a first state in which the first camera of the support member is occluded by the front plate and the second camera is occluded by the rear plate, the electronic device may be configured into a second state in which the first camera is visible, and, when the front plate slides in a fourth direction opposite to the third direction with respect to the rear plate in the first state, the support member may be configured to slide along with the front plate and the electronic device is configured into a third state in which the second camera is visible.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
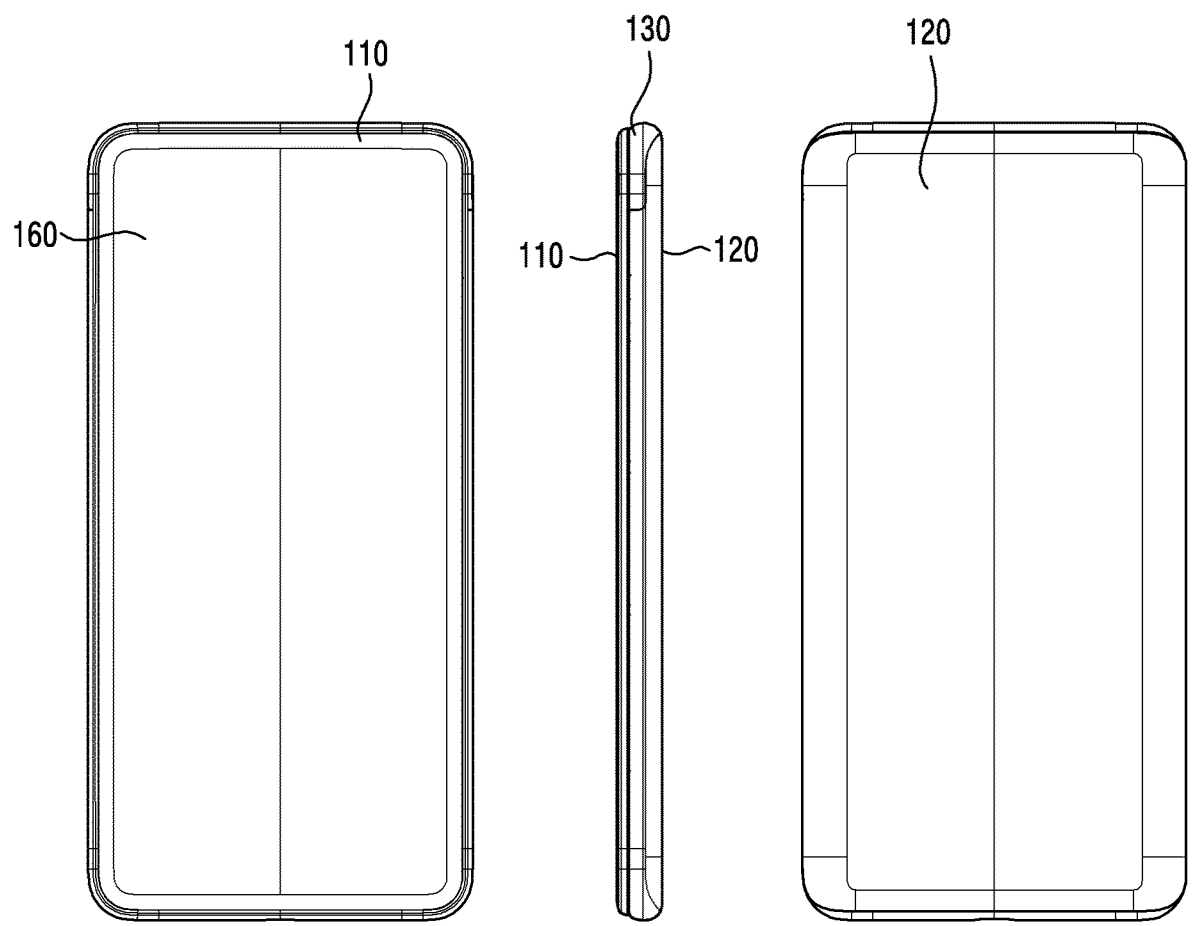
FIG. 1 is a view illustrating an electronic device in a first designated state according to one or more embodiments.

Hereinafter, various embodiments of the disclosure will be described with reference to the accompanying drawings. It should be appreciated that various embodiments are not intended to limit the technological features set forth herein to particular embodiments, and include various modifications, equivalents, and/or alternatives of embodiments of the disclosure. With regard to the description of the drawings, similar reference numerals may be used to refer to similar elements.

In the disclosure disclosed herein, the expressions "have," "may have," "include" and "comprise," or "may include" and "may comprise" used herein indicate existence of corresponding features (for example, elements such as numeric values, functions, operations, or components) and do not preclude the presence of additional features.

In the disclosure disclosed herein, the expressions "A or B," "at least one of A or/and B," or "one or more of A or/and B," and the like may include all possible combinations of the items enumerated together. For example, "A or B," "at least one of A and B," or "at least one of A or B" may refer to all of the case (1) where at least one A is included, the case (2) where at least one B is included, or the case (3) where both of at least one A and at least one B are included.

As used herein, such terms as "1st" and "2nd," or "first" and "second" may be used to simply distinguish a corresponding component from another, and does not limit the components in other aspect (e.g., importance and/or order). For example, "a first user device" and "a second user device" indicate different user devices regardless of the order or priority. For example, without departing from the scope of the disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), the element can be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element) between the element and another element.

According to the situation, the term "configured to (or set to)" used in the disclosure may be interchangeably used with the terms "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of" operating together with another device or other components. For example, "a processor configured (set) to perform A, B, and C" may refer, for example, and without limitation, to a dedicated processor (for example, an embedded processor) for performing a corresponding operation, or a generic-purpose processor (for example, a central processing unit (CPU) or an application processor (AP)), or the like, for performing corresponding operations by executing one or more software programs stored in a memory device.

Terms used in the disclosure are used to describe specified embodiments and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistant (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable devices may include at least one of accessories (for example, watches, rings, bracelets, ankle bracelets, necklaces, glasses, contact lenses, head-mounted-devices (HMDs), etc.), fabric- or clothing-mounted devices (for example, electronic apparels), body-mounted devices (for example, skin pads, tattoos, etc.), or bio-implantable circuits.

According to some embodiments, the electronic devices may be home appliances. The home appliances include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, TV boxes (for example, Samsung HomeSync™, Apple TV™, or Google TV™), game consoles (for example, Xbox™ and PlayStation™), electronic dictionaries, electronic keys, camcorders, or electronic picture frames.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite systems (GNSS), event data recorders (EDRs), flight data recorders (FDRs), vehicle infotainment devices, electronic equipment for vessels (for example, navigation systems and gyrocompasses), avionics, security devices, head units for vehicles, industrial or home robots, automatic teller's machines (ATMs) of financial institutions, points of sales (POSs) of stores, or Internet of things (for example, light bulbs, various sensors, electricity or gas meters, sprinkler devices, fire alarms, thermostats, street lamps, toasters, exercise equipment, hot water tanks, heaters, boilers, or the like).

According to an embodiment, the electronic devices may include at least one of furniture, a part of buildings/structures, electronic boards, electronic signature receiving devices, projectors, or various measuring instruments (for example, water meters, electricity meters, gas meters, or wave meters). In various embodiments, the electronic devices may be one or a combination of two or more devices of the above-mentioned devices. According to a certain embodiment, the electronic device may be a flexible electronic device or a foldable electronic device. Also, the electronic devices according to various embodiments of the disclosure are not limited to the above-mentioned devices, and may include new electronic devices according to technology development.

In the disclosure, the term "user" may refer to a person who uses the electronic device or a device that uses the electronic device (for example, an artificial intelligence electronic device).

Hereinafter, various embodiments will be described in detail with reference to the accompanying drawings. However, dimensions of elements in the drawings may be exaggerated or reduced for convenience of explanation. For example, sizes and thicknesses of respective elements shown in the drawings are arbitrarily illustrated for convenience of explanation, and thus the disclosure should not be limited to the illustrations of the drawings.

FIG. 1 illustrates an electronic device in a first designated state according to one or more embodiments.

Referring to FIG. 1, the electronic device 100 may include a front plate 110, a rear plate 120, and a support member 130.

In one or more embodiments, the front plate 110 may face in a first direction. In one or more embodiments, the front plate 110 may include a display 160. In one or more embodiments, the display 160 may be seen through the entire area of the front plate 110 or a partial area of the front plate 110.

In an embodiment, the display 160 may include a planar portion and at least one curved portion extended from the planar portion. For example, the display 160 may include a first edge, a second edge substantially parallel with the first edge, a third edge extended from an end of the first edge to an end of the second edge, and a fourth edge extended from the other end of the first edge to the other end of the second edge. The display 160 may include the curved portion formed on at least one of the first edge, the second edge, the third edge, and the fourth edge. In an embodiment, the curved portion may be referred to as an edge portion since the curved portion may be formed on at least a portion of the first edge, the second edge, the third edge, and the fourth edge.

In an embodiment, the only element of the electronic device 100 seen through the front plate 110 may be the display 160. For example, in contrast with an electronic device according to an embodiment in which at least one sensor (for example, camera, illumination sensor, etc.) disposed within the peripheral area of the display is seen through the front plate or is disposed within the display which is included within the front plate, the electronic device 100 may include the display 160 that is the only component seen through the front plate 110. For example, in the electronic device 100, the at least one sensor, which is typically disposed within the peripheral area of the display or disposed within the display, may be included within the support member 130 distinct from the front plate 110. However, this should not be considered as limiting.

In one or more embodiments, the rear plate 120 may face in a second direction. For example, the second direction may be opposite to the first direction.

In one or more embodiments, the support member 130 may be disposed between the front plate 110 and the rear plate 120. In one or more embodiments, the support member 130 may include a first surface facing in the first direction, a second surface facing in the second direction, and a side surface surrounding the first surface and the second surface. For example, the second surface may refer to a surface that is disposed opposite the first surface and faces away from the first surface. For example, the side surface may refer to a surface that is extended from the first surface to the second surface. In one or more embodiments, the first surface may include a first camera. For example, the first camera (or an optical axis of a lens of the first camera) may face in the first direction. For example, the first camera may be referred to as a front facing camera since the first camera faces in the first direction, which is the same as the display 160 or the front plate 110. For example, the first camera may include a plurality of cameras in order to better capture images. In one or more embodiments, the second surface may include a second camera. For example, the second camera (or an optical axis of a lens of the second camera) may face in the second direction. For example, the second camera may be referred to as a rear facing camera since the second camera faces in the second direction, which is the same as the rear plate 120. For example, the second camera may include a plurality of cameras in order to better capture images.

In one or more embodiments, the state of the electronic device 100 shown in FIG. 1 may be referred to as the first designated state. For example, the first designated state may be when an upper end of the front plate 110, an upper end of the support member 130, and an upper end of the rear plate 120 are completely superimposed on one another when viewed above the front plate 110. In another example, the first designated state may be when the upper end of the front plate 110, the upper end of the support member 130, and the upper end of the rear plate 120 are completely superimposed on one another when viewed above the rear plate 120. For example, the first designated state may be when the first camera included in the first surface of the support member 130 is occluded by the front plate 110, and the second camera included in the second surface of the support member 130 is occluded by the rear plate 120. In addition, the first designated state may refer to a state in which none of the first camera and the second camera are seen. For example, the first designated state may refer to a state in which the support member 130 is attached to a first portion of the rear plate and the first camera is occluded by the front plate 110, and the second camera is occluded by the rear plate 120. However, this should not be considered as limiting.

Figure 2:
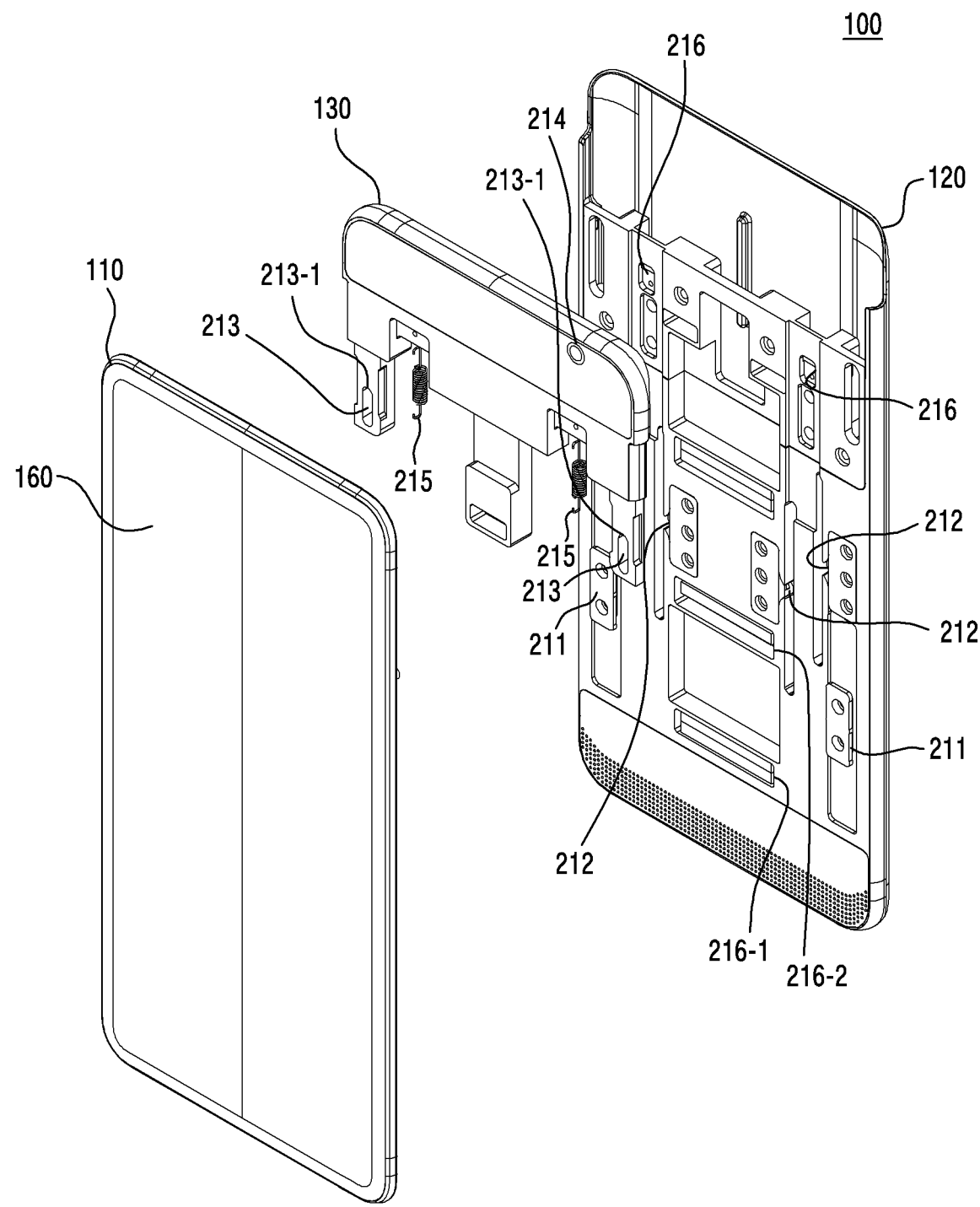
FIG. 2 is an exploded perspective view of the electronic device according to one or more embodiments of FIG. 1.
Figure 3:
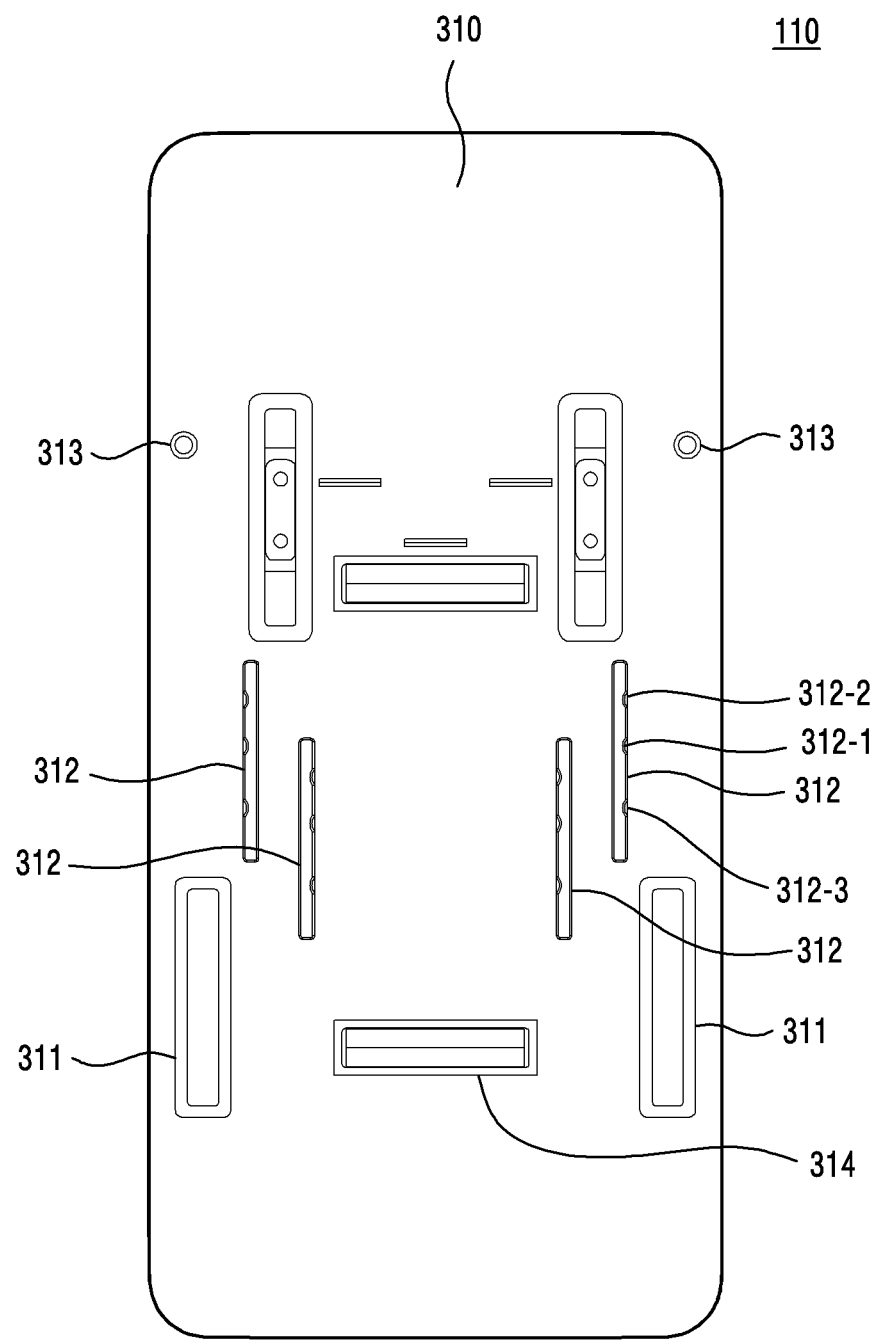
FIG. 3 is a top view illustrating a back surface of a front plate of the electronic device according to one or more embodiments of FIG. 1.
Figure 4:
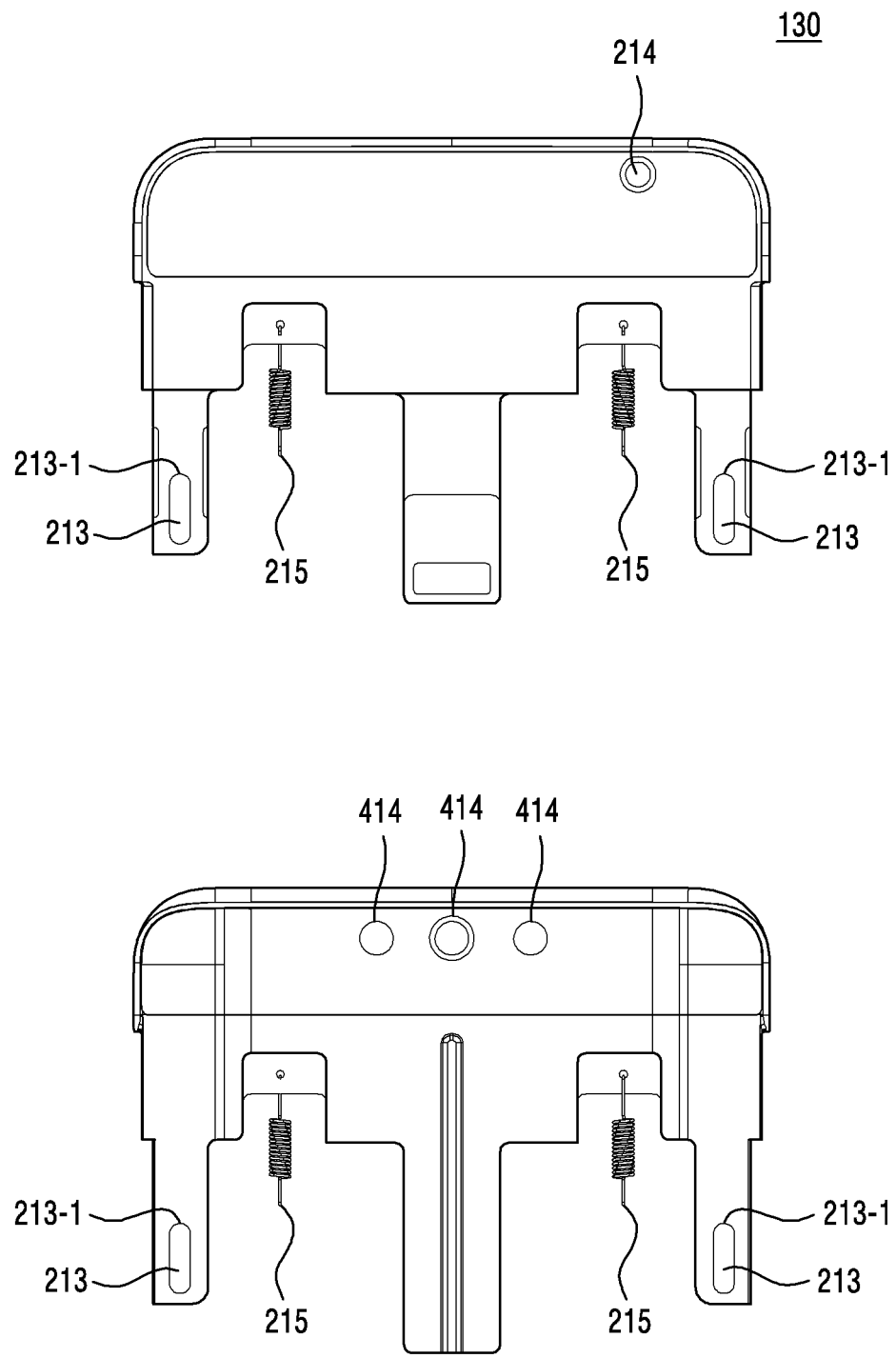
FIG. 4 is top views illustrating a front surface and a rear surface of a support member of the electronic device according to one or more embodiments of FIG. 1.
Figure 5:
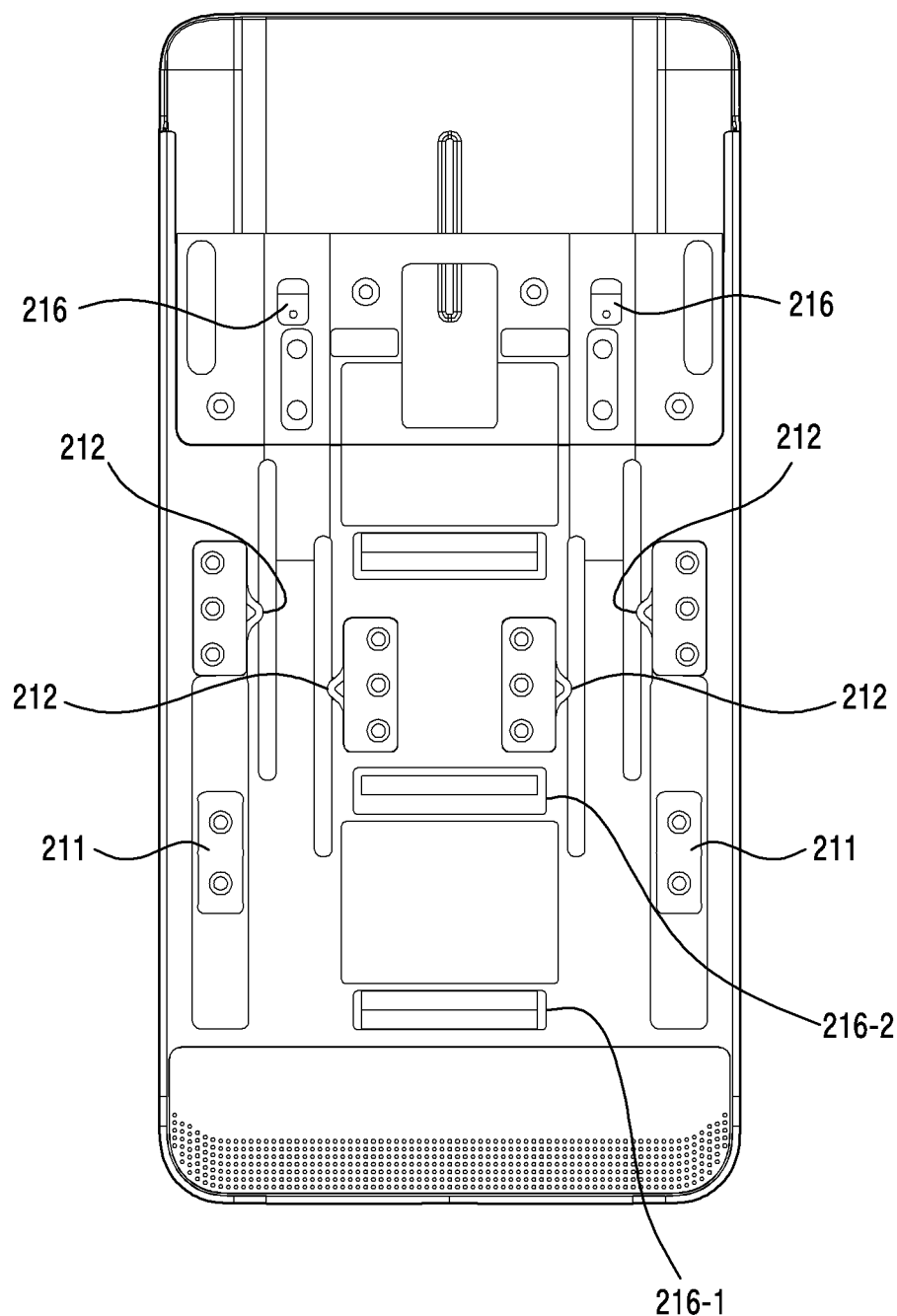
FIG. 5 is a top view illustrating a front surface of a rear plate of the electronic device according to one or more embodiments of FIG. 1.

FIG. 2 is an exploded perspective view of the electronic device according to one or more embodiments of FIG. 1. FIG. 3 is a top view illustrating a back surface of the front plate of the electronic device according to one or more embodiments of FIG. 1. FIG. 4 is top views illustrating a front surface and a rear surface of the support member of the electronic device according to one or more embodiments of FIG. 1. FIG. 5 is a top view illustrating a front surface of the rear plate of the electronic device according to one or more embodiments of FIG. 1.

Referring to FIG. 2, the electronic device 100 according to one or more embodiments may include the front plate 110, the rear plate 120, and the support member 130 disposed between the front plate 110 and the rear plate 120.

In one or more embodiments, the front plate 110 may provide a space to have the display 160 mounted therein. In an embodiment, the only element of the electronic device 100 that is seen within the front plate 110 may be the display 160. However, this should not be considered as limiting.

In one or more embodiments, the front plate 110 may be slidable in two directions to provide a second designated state and a third designated state, which will be described below. For example, the front plate 110 may slide by a first designated distance in a third direction (for example, a downward direction) perpendicular to the first direction and the second direction to provide the second designated state which is different from the first designated state. For example, the second designated state may be when the front plate 110 in the first designated state slides by the first designated distance in the third direction, and the first camera is revealed by the sliding of the front plate 110 in the third direction but yet the second camera is still occluded by the rear plate 120. An example of the second designated state will be described below with reference to FIGS. 7 and 8. For example, the front plate 110 may slide by a second designated distance in a fourth direction which is perpendicular to the first direction and the second direction and is opposite to the third direction to provide the third designated state which is different from the first designated state. For example, the third designated state may be when the front plate 110 in the first designated state slides by the second designated distance in the fourth direction, and the second camera is revealed by the sliding of the front plate 110 in the fourth direction, in which the support member 130 slides along with the front plate 110. In this case, the first camera may still be occluded by the front plate 110. An example of the third designated state will be described below with reference to FIGS. 9 and 10.

For example, the front plate 110 may be movably or slidably connected or coupled with the rear plate 120 to slide in the third direction and to slide in the fourth direction. For example, referring to FIGS. 2, 3, and 5, the front plate 110 may include at least one guide path 311 and at least one stopper 312 to achieve the sliding in the third direction and the sliding in the fourth direction. For example, the at least one guide path 311 may be slidably connected with at least one guide member 211 of the rear plate 120. For example, the at least one guide path 311 may limit the sliding movement of the front plate 110 in the third direction and the fourth direction by limiting the sliding movement of the at least one guide member 211 of the rear plate 120 in the third direction and the fourth direction.

For example, the at least one stopper 312 may include a first groove 312-1 into which at least one elastic protrusion 212 of the rear plate 120 can be at least in part inserted in the first designated state, a second groove 312-2 into which the at least one elastic protrusion 212 of the rear plate 120 can be at least in part inserted in the second designated state, and a third groove 312-3 into which the at least one elastic protrusion 212 of the rear plate 120 can be at least in part inserted in the third designated state. For example, the first groove 312-1 may be disposed between the second groove 312-2 and the third groove 312-3. For example, the second groove 312-2 may be spaced apart from the first groove 312-1 by the first designated distance in order to limit the distance by which the front plate 110, previously in the first designated state, can slide in the third direction. Similarly, the third groove 312-3 may be spaced apart from the first groove 312-1 by the second designated distance in order to limit the distance by which the front plate 110, previously in the first designated state, can slide in the fourth direction.

For example, the front plate 110 may be connected with the support member 130 to slide along with the support member 130 when transitioning from the first designated state to the third designated state. For example, referring to FIGS. 2, 3, and 4, the front plate 110 may include at least one protrusion 313 that may be movably inserted into at least one guide hole 213 of the support member 130. For example, when the front plate 110 slides by the second designated distance in the fourth direction from the first designated state in which the support member 130 is attached to the first portion of the rear plate 120, the support member 130 may be detached from the first portion of the rear plate 120, due to the force generated by the at least one protrusion 313 of the front plate 110 pushing on an end 213-1 of the at least one guide hole 213 in the fourth direction, such that the support member 130 can slide along with the front plate 110.

For example, the front plate 110 may include at least one fixing member to maintain the first designated state, to maintain the second designated state, and to maintain the third designated state. For example, referring to FIGS. 2, 3, and 5, the front plate 110 may include at least one fixing member 314 to be coupled with a plurality of fixing members of the rear plate 120 including a first fixing member 216-1 and a second fixing member 216-2 of the rear plate 120. For example, the at least one fixing member 314 of the front plate may be coupled with the first fixing member 216-1 from among the plurality of fixing members to maintain the second designated state. For example, the at least one fixing member 314 of the front plate may be coupled with the second fixing member 216-2 from among the plurality of fixing members to maintain the third designated state. In an embodiment, each of the at least one fixing member 314 and the plurality of fixing members may be implemented with a magnet. However, this should not be considered as limiting.

In one or more embodiments, the support member 130 may include the first camera 214 and the second camera 414 (for example, the second camera 414 of FIG. 4). For example, the first camera 214 and the second camera 414 may correspond to those described in connection with FIG. 1.

In one or more embodiments, the support member 130 may be detachably attached to the first portion of the rear plate 120. For example, when the state of the electronic device 100 switches from the first designated state to the second designated state, the support member 130 may maintain the attachment to the first portion of the rear plate 120 independently from (or regardless of) the sliding of the front plate 110 in the third direction. In another example, when the state of the electronic device 100 switches from the first designated state to the third designated state, the support member 130 may be detached from the first portion of the rear plate, such that the support member 130 can slide along with the front plate 110 in the fourth direction. For example, referring to FIGS. 2, 4, and 5, the support member 130 may include at least one elastic member 215 to be detachably attached to the first portion of the rear plate 120. For example, an end of the at least one elastic member 215 may be connected with the support member 130, and the other end of the at least one elastic member 215 may be connected with at least one connection portion 216 of the rear plate 120. For example, when the state of the electronic device 100 switches from the first designated state to the second designated state, the elastic force of the at least one elastic member 215 may be used to maintain the attachment of the support member 130 to the first portion of the rear plate 120, independently from the sliding of the front plate 110 in the third direction. For example, when the first designated state switches to the second designated state, the support member 130 may maintain the attachment to the first portion of the rear plate 120, based on the elastic force of the at least one elastic member 215 in the fourth direction. When the state of the electronic device 100 switches from the first designated state to the third designated state, the force of the at least one protrusion 313 pushing the at least one guide hole 213 is greater than the elastic force of the at least one elastic member 215 in the third direction, caused by the sliding of the front plate 110 in the fourth direction, and therefore, the support member 130 may slide along with the front plate 110 in the fourth direction.

Although FIGS. 2, 3, 4, and 5 illustrate that the first camera 214 and the second camera 414 are included within the support member 130, this is merely for convenience of explanation. In one or more embodiments, the support member 130 may include various sensors for acquiring information from the outside. For example, the support member 130 may include an illumination sensor for acquiring illumination information around the electronic device 100, a biometric sensor (for example, a photoplethysmography (PPG) sensor) for acquiring biometric information such as heartbeat information, or a fingerprint sensor for user authentication. In one or more embodiments, the support member 130 may further include a microphone for acquiring an audio signal around the electronic device 100, a speaker for outputting an audio signal to the outside of the electronic device 100, and a flash to assist in photographing by the first camera 214 or the second camera 414.

As described above, the electronic device 100 according to one or more embodiments has the first designated state, the second designated state, and the third designated state, thereby making the first camera 214 or the second camera 414 included within the support member 130 visible according to a sliding direction of the front plate 110.

Figure 6:
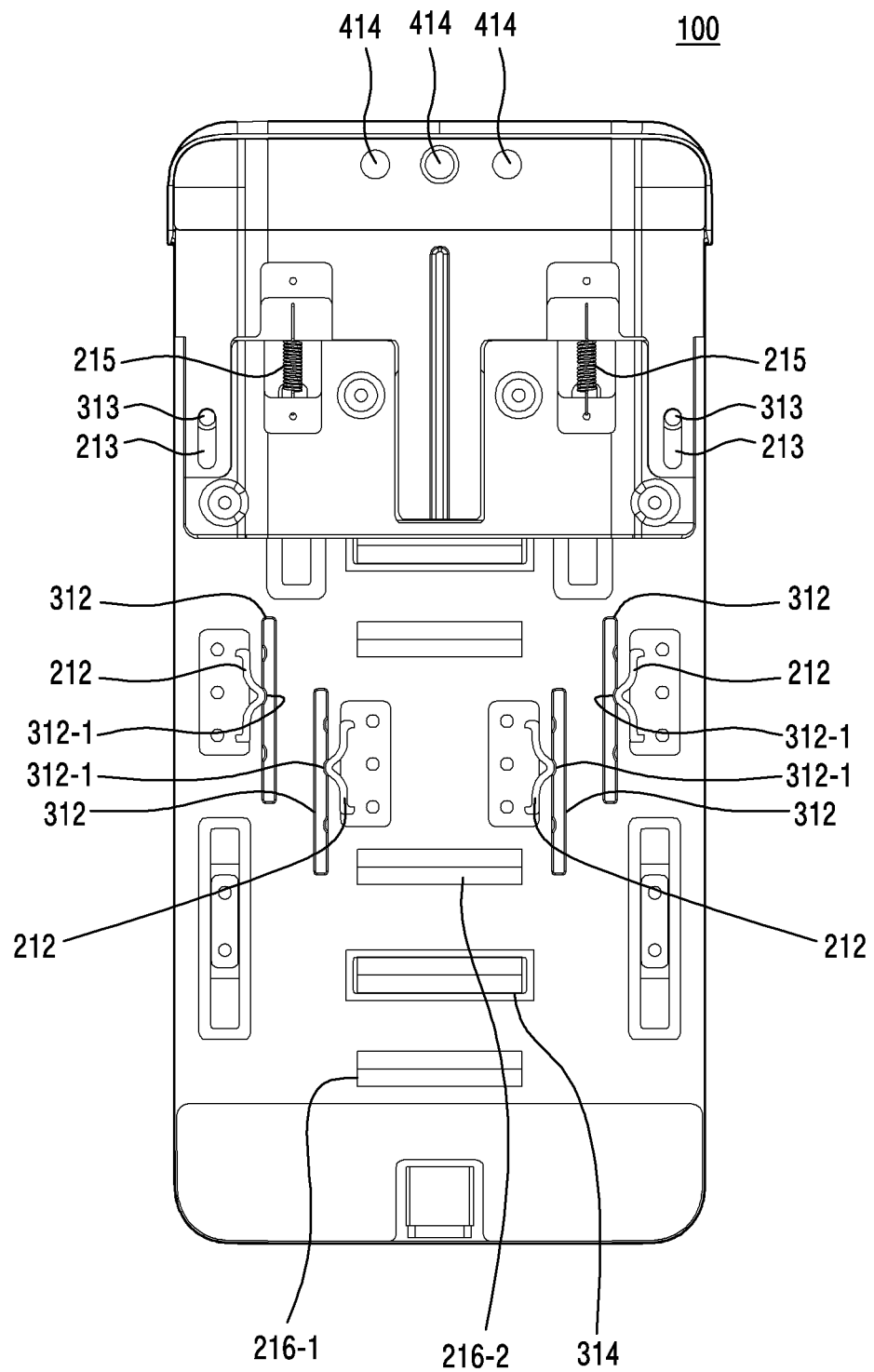
FIG. 6 is a top view illustrating the electronic device, from which the display is removed for illustrative purposes, in the first designated state according to one or more embodiments.

FIG. 6 is a top view illustrating the electronic device, from which the display is removed for illustrative purposes, in the first designated state according to one or more embodiments.

Referring to FIG. 6, in the first designated state, the front plate 110 and the rear plate 120 may be substantially completely superimposed on one another. In the first designated state, the upper end of the front plate 110, the upper end of the rear plate 120, and the upper end of the support member 130 may be superimposed on one another.

In the first designated state, the support member 130 may be attached to the first portion of the rear plate 120 through the at least one elastic member 215. For example, the support member 130 and the rear plate 120 may be attached to each other by the elastic force of the at least one elastic member 215. In the first designated state, the force of the at least one protrusion 313 pushing the end 213-1 of the at least one guide hole 213 may be smaller than the elastic force of the at least one elastic member 215.

In the first designated state, the at least one elastic protrusion 212 may be at least in part inserted into the first groove 312-1 from among the first groove 312-1, the second groove 312-2, and the third groove 312-3 included in the at least one stopper 312. In one or more embodiments, the at least one elastic protrusion 212 and the first groove 312-1 may be used to maintain the first designated state. In the first designated state, the at least one guide member 211 may be slidably connected with the at least one guide path 311. The at least one guide member 211 in the first designated state may be disposed on a position within the at least one guide path 311, where the at least one guide member 211 may be moved by the first designated distance in the third direction and may be moved by the second designated distance in the fourth direction, such that the state of the electronic device 100 can switch from the first designated state to the second designated state or from the first designated state to the third designated state.

Figure 7:
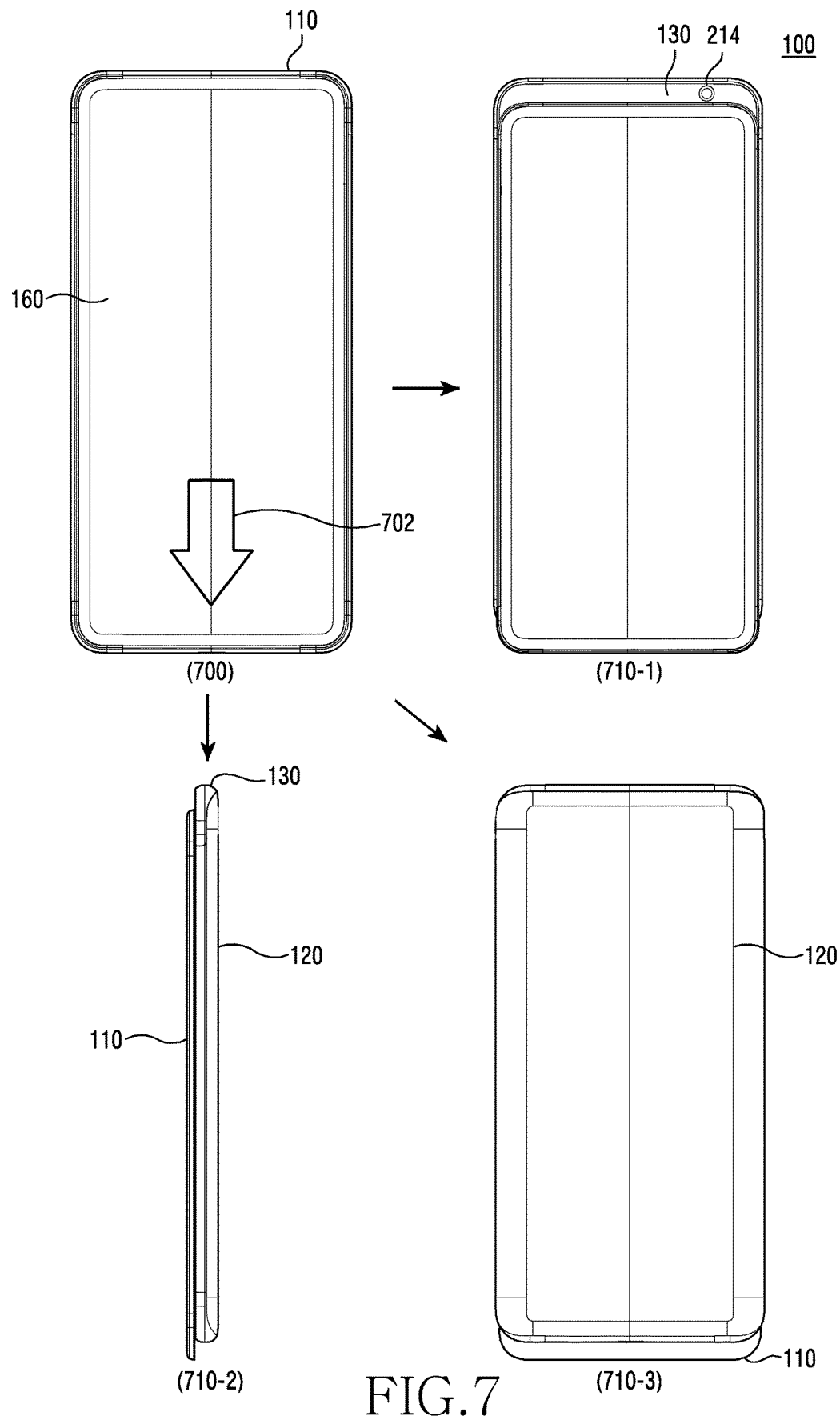
FIG. 7 is a view illustrating the electronic device switching from the first designated state to the second designated state according to one or more embodiments.

FIG. 7 illustrates the electronic device switching from the first designated state to the second designated state according to one or more embodiments.

Referring to FIG. 7, the electronic device 100 described in connection with FIGS. 1-6 may switch from the first designated state 700 to the second designated state 710-1, 710-2, 710-3. The second designated state 710-1, 710-2, 710-3 may be examples of the second designated state described in connection with FIGS. 1-6. For example, when the front plate 110 slides by the first designated distance in the third direction 702 (corresponding to the third direction described in connection with FIGS. 1-6), the electronic device 100 may switch from the first designated state 700 to the second designated state 710-1, 710-2, 710-3.

In one or more embodiments, in the second designated state, the front plate 110 may be moved by the first designated distance in the third direction 702 with respect to the rear plate 120 and the support member 130, whereas positions of the rear plate 120 and the support member 130 may be maintained independently from the sliding of the front plate 110 in the third direction 702. For example, the support member 130 may maintain attachment to the first portion of the rear plate 120 while the front plate 110 is slid in the third direction 702, and the first camera 214 may be made visible because the position of the support member 130 is maintained.

For example, the second designated state 710-1 may illustrate a front view of the electronic device 100 in the second designated state. As can be seen through the second designated state 710-1, when the electronic device 100 is in the second designated state, the position of the front plate 110 may be moved by the first designated distance in the third direction 702, compared to the position of the front plate 110 in the first designated state, whereas the positions of the rear plate 120 and the support member 130 are maintained the same as in the first designated state. The first camera 214 may be visible due to the movement of the front plate 110 in the third direction 702, and the maintaining by the rear plate 120 and the support member 130.

For example, the second designated state 710-2 may illustrate a side view of the electronic device 100 in the second designated state. As can be seen through the second designated state 710-2, when the electronic device 100 is in the second designated state, the position of the front plate 110 may be moved by the first designated distance in the third direction 702, compared to the position of the front plate 110 in the first designated state, whereas the positions of the rear plate 120 and the support member 130 may be maintained the same as in the first designated state. The first camera 214 may be visible due to the movement of the front plate 110 in the third direction 702, and the maintaining by the rear plate 120 and the support member 130. The second camera 414 may be occluded by the rear plate 120 due to the positions of the rear plate 120 and the support member 130 being maintained independently from the movement of the front plate 110 in the third direction 702.

For example, the second designated state 710-3 may illustrate a rear view of the electronic device 100 in the second designated state. As can be seen through the second designated state 710-3, when the electronic device 100 is in the second designated state, the position of the front plate 110 may be moved by the first designated distance in the third direction 702, compared to the position of the front plate 110 in the first designated state, and accordingly, the lower end of the front plate 110 may be positioned below the lower end of the rear plate 120. In contrast with the first camera 214, the second camera 414 may be occluded by the rear plate 120 due to the positions of the rear plate 120 and the support member 130 being maintained independently from the movement of the front plate 110 in the third direction 702.

Figure 8:
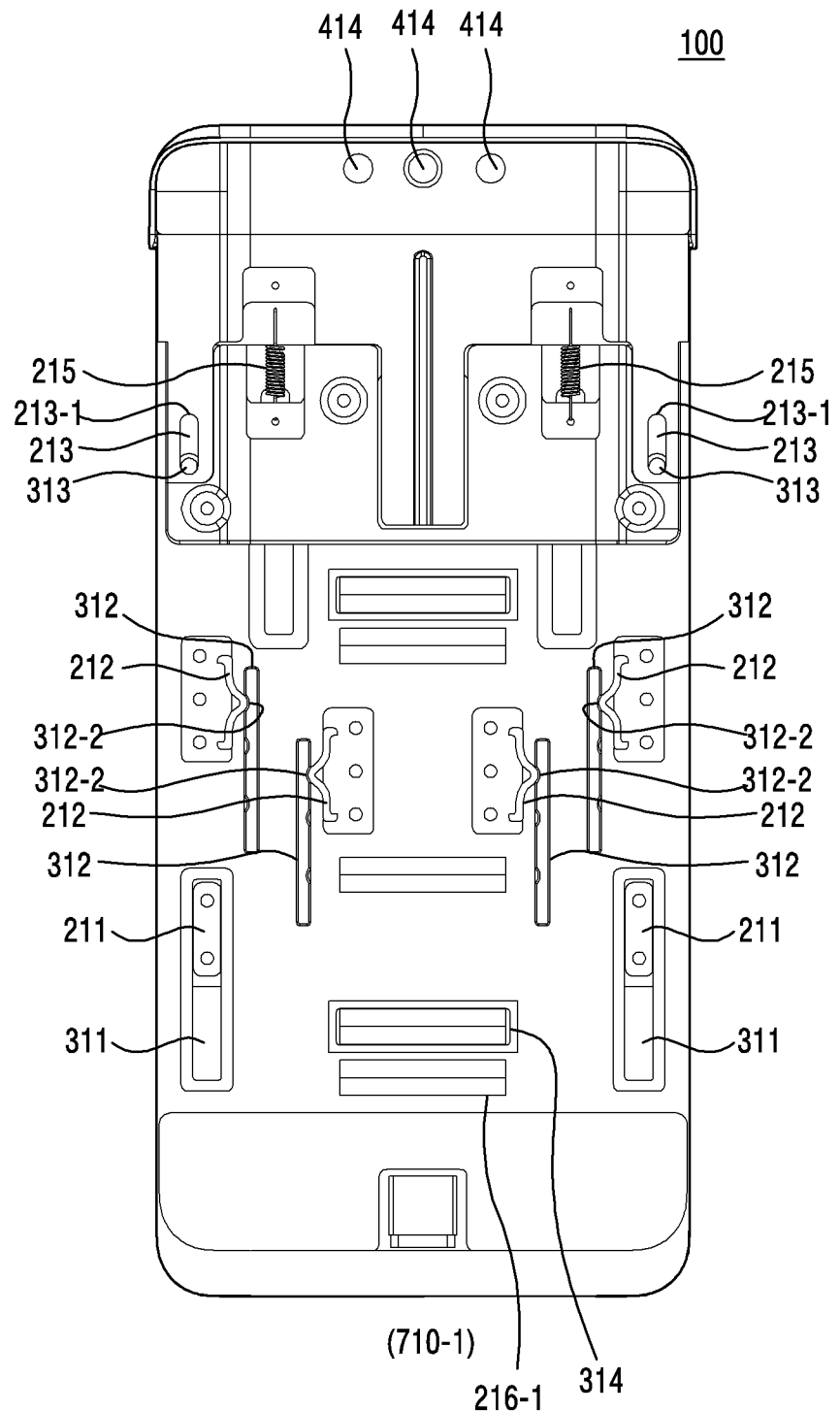
FIG. 8 is a top view illustrating the electronic device, from which the display is removed for illustrative purposes, in the second designated state according to one or more embodiments.

FIG. 8 is a top view illustrating the electronic device, from which the display is removed for illustrative purposes, in the second designated state according to one or more embodiments.

In one or more embodiments, in the second designated state 710-1 as shown in FIG. 8, the front plate 110 may be moved by the first designated distance in the third direction 702 with respect to the rear plate 120 and the support member 130. In the second designated state 710-1, the upper end of the front plate 110 may be positioned below the upper end of the rear plate 120 and the upper end of the support member 130.

In the second designated state 710-1 according to one or more embodiments, the support member 130 may be attached to the first portion of the rear plate 120 through the at least one elastic member 215. For example, the support member 130 and the rear plate 120 may be attached to each other by the elastic force of the at least one elastic member 215. In the second designated state 710-1, the force of the at least one protrusion 313 pushing the end 213-1 of the at least one guide hole 213 may be smaller than the elastic force of the at least one elastic member 215.

In the second designated state 710-1 according to one or more embodiments, the at least one elastic protrusion 212 may be at least in part inserted into the second groove 312-2 from among the first groove 312-1, the second groove 312-2, and the third groove 312-3 included in the at least one stopper 312. In one or more embodiments, the at least one elastic protrusion 212 and the second groove 312-2 may be used to maintain the second designated state 710-1. In the second designated state 710-1 according to one or more embodiments, the at least one guide member 211 may be slidably connected with the at least one guide path 311. Since the at least one guide member 211 in the second designated state 710-1 according to one or more embodiments is in contact with an end of the at least one guide path 311, the distance by which the front plate 110 slides in the third direction 702 may be limited to the first designated distance.

Figure 9:
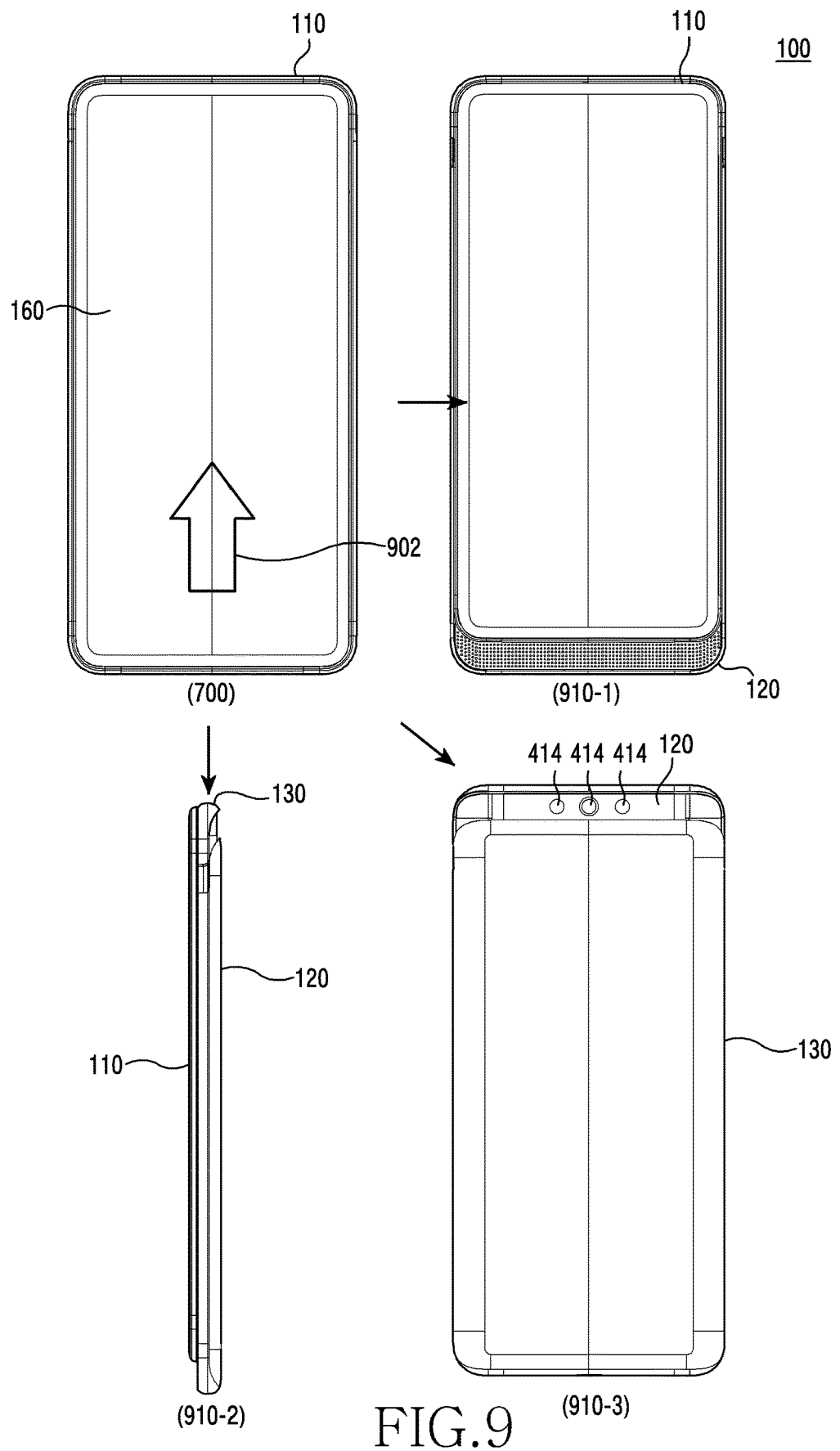
FIG. 9 is a view illustrating the electronic device switching from the first designated state to a third designated state according to one or more embodiments.

FIG. 9 illustrates the electronic device switching from the first designated state to the third designated state according to one or more embodiments.

Referring to FIG. 9, the electronic device 100 described in connection with FIGS. 1-6 may switch from the first designated state 700 to the third designated state 910-1, 910-2, 910-3. The third designated state 910-1, 910-2, 910-3 may be examples of the third designated state described in connection with FIGS. 1-6. For example, when the front plate 110 slides by the second designated distance in the fourth direction 902 (corresponding to the fourth direction described in connection with FIGS. 1-6), the electronic device 100 may switch from the first designated state 700 to the third designated state 910-1, 910-2, 910-3.

In one or more embodiments, in the third designated state, the front plate 110 and the support member 130 may be moved by the second designated distance in the fourth direction 902 with respect to the rear plate 120, whereas the position of the rear plate 120 may be maintained independently from the sliding of the front plate 110 and the support member 130 in the fourth direction 902. For example, when the state of the electronic device 100 switches from the first designated state to the third designated state, the support member 130 may be detached from the first portion of the rear plate 120, thereby sliding along with the front plate 110 in the fourth direction 902. The second camera 414 may be made visible based on the sliding of the front plate 110 and the support member 130 and the maintaining of the position of the rear plate 120.

For example, the third designated state 910-1 may illustrate a front view of the electronic device 100 in the third designated state. As can be seen through the third designated state 910-1, when the electronic device 100 is in the third designated state, the position of the front plate 110 may be moved by the second designated distance in the fourth direction 902, compared to the position of the front plate 110 in the first designated state, and the position of the support member 130 may be moved in the fourth direction 902, compared to the position of the support member 130 in the first designated state, whereas the position of the rear plate 120 may be maintained the same as in the first designated state. In one or more embodiments, the first camera 214 may be occluded by the front plate 110 due to the movement of the front plate 110 and the support member 130 in the fourth direction 902 and the maintaining by the rear plate 120.

For example, the third designated state 910-2 may illustrate a side view of the electronic device 100 in the third designated state. As can be seen through the third designated state 910-2, when the electronic device 100 is in the third designated state, the position of the front plate 110 may be moved by the second designated distance in the fourth direction 902, compared to the position of the front plate 110 in the first designated state, and the position of the support member 130 may be moved in the fourth direction 902, compared to the position of the support member 130 in the first designated state, whereas the position of the rear plate 120 may be maintained the same as in the first designated state. In one or more embodiments, the second camera 414 may be visible due to the movement of the front plate 110 and the support member 130 in the fourth direction 902 and the maintaining by the rear plate 120. In one or more embodiments, the first camera 214 may be occluded by the front plate 110 due to the movement of the front plate 110 and the support member 130 in the fourth direction 902 and the maintaining by the rear plate 120.

For example, the third designated state 910-3 may illustrate a rear view of the electronic device 100 in the third designated state. As can be seen through the third designated state 910-3, when the electronic device 100 is in the third designated state, the position of the front plate 110 may be moved by the second designated distance in the fourth direction 902, compared to the position of the front plate 110 in the first designated state, and the position of the support member 130 may be moved in the fourth direction 902, compared to the position of the support member 130 in the first designated state, whereas the position of the rear plate 120 may be maintained the same as in the first designated state. In one or more embodiments, the second camera 414 may be visible due to the movement of the front plate 110 and the support member 130 in the fourth direction 902, and the maintaining by the rear plate 120.

Figure 10:
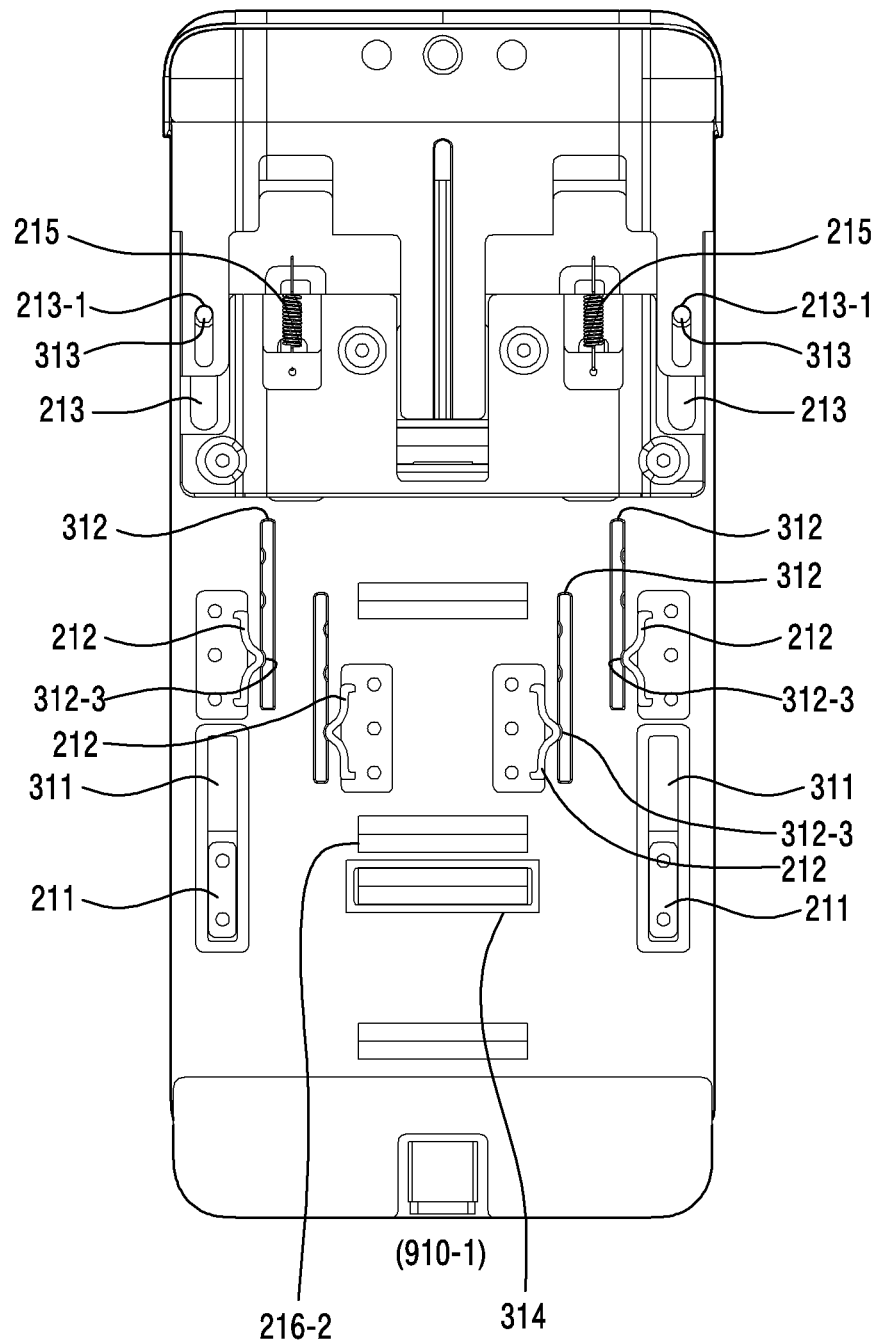
FIG. 10 is a top view illustrating the electronic device, from which the display is removed for illustrative purposes, in the third designated state according to one or more embodiments.

FIG. 10 is a top view illustrating the electronic device, from which the display is removed for illustrative purposes, in the third designated state according to one or more embodiments.

Referring to FIG. 10, in the third designated state 910-1 according to one or more embodiments, the front plate 110 may be moved by the second designated distance in the fourth direction 902 with respect to the rear plate 120. In the third designated state 910-1, the support member 130 may be detached from the first portion of the rear plate 120, thereby sliding along with the front plate 110 in the fourth direction 902. In the third designated state 910-1, the upper end of the front plate 110 may be positioned above the upper end of the rear plate 120.

In the third designated state 910-1 according to one or more embodiments, the force of the at least one protrusion 313 pushing the end 213-1 of the at least one guide hole 213 may be greater than the elastic force of the at least one elastic member 215. Accordingly, the support member 130 may be detached from the first portion of the rear plate 120, thereby sliding along with the front plate 110 in the fourth direction 902.

In the third designated state 910-1 according to one or more embodiments, the at least one elastic protrusion 212 may be at least in part inserted into the third groove 312-3 from among the first groove 312-1, the second groove 312-2, and the third groove 312-3 included in the at least one stopper 312. In one or more embodiments, the at least one elastic protrusion 212 and the third groove 312-3 may be used to maintain the third designated state 910-1. In the third designated state 910-1, the at least one guide member 211 may be slidably connected with the at least one guide path 311. Since the at least one guide member 211 in the third designated state 910-1 is in contact with the other end of the at least one guide path 311, the distance by which the front plate 110 slides in the fourth direction 902 may be limited to the second designated distance.

As described above, the electronic device 100 according to one or more embodiments may include the front plate 110 slidable in both third and fourth directions, and the support member 130 detachably attached to the rear plate 120, such that the electronic device 100 can provide the first designated state, the second designated state, and the third designated state. The electronic device 100 according to one or more embodiments can enhance user experience related to availability of the first camera 214 and the second camera 414 by providing the first designated state, the second designated state, and the third designated state. Since the electronic device 100 according to one or more embodiments can make the first camera 214 and the second camera 414 visible by sliding the front plate 110 in both directions based on force from the user, the electronic device 100 has better power consumption characteristics, compared to electronic devices that use motors to extend cameras out of the housings of the electronic devices to make them visible. Since the electronic device 100 according to one or more embodiments can occlude the first camera 214 and the second camera 414 when the first camera 214 and the second camera 414 are not used, a more simplified exterior can be provided.

Figure 11:
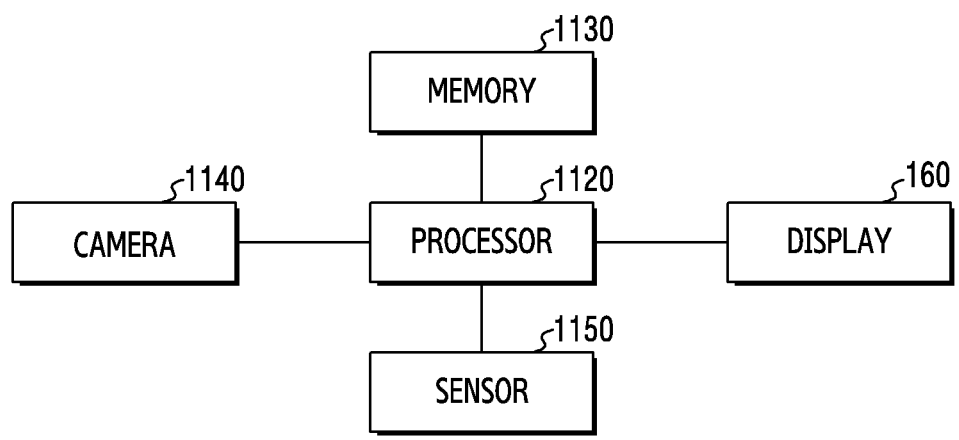
FIG. 11 is a schematic block diagram of the electronic device according to one or more embodiments.

FIG. 11 is a schematic block diagram of an electronic device according to one or more embodiments.

Referring to FIG. 11, the electronic device 100 may include a processor 1120, a memory 1130, a camera 1140, a display 160, and a sensor 1150.

The processor 1120 according to one or more embodiments may control overall operations of the electronic device 100. For example, the processor 1120 may execute applications for providing advertisement, Internet, games, videos, etc. In one or more embodiments, the processor 1120 may include a single processor core or may include a plurality of processor cores. For example, the processor 1120 may include multi-cores such as dual-core, quad-core, hexa-core, etc. According to one or more embodiments, the processor 1120 may further include a cache memory positioned inside or outside the processor 1120.

The processor 1120 according to one or more embodiments may receive commands of other elements of the electronic device 100, may interpret the received commands, and may perform computation or process data according to the interpreted commands. The processor 1120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The processor 1120 according to one or more embodiments may process data or signal which is generated or occurs in an application. For example, the processor 1120 may request instruction, data, or signal from the memory 1130 to execute or control an application. The processor 1120 may record (or store) or refine instruction, data, or signal on the memory 1130 to execute or control an application.

The processor 1120 according to one or more embodiments may interpret and process message, data, instruction, or signal received from the memory 1130, the display 160, the camera 1140, or the sensor 1150. The processor 1120 may generate new message, data, instruction, or signal, based on the received message, data, instruction, or signal. The processor 1120 may provide the processed or generated message, data, instruction, or signal to the memory 1130, the display 160, the camera 1140, or the sensor 1150.

The entirety or a portion of the processor 1120 according to one or more embodiments may be electrically or operably (or operatively) coupled with or connected to other elements (for example, the memory 1130, the display 160, the camera 1140, or the sensor 1150) in the electronic device 100.

According to one or more embodiments, the processor 1120 may be configured with one or more processors. For example, the processor 1120 may include one or more of an application processor (AP) for controlling an upper layer program such as an application program, a graphic processing unit (GPU) for controlling the display 160, or a communication processor (CP) for controlling a communication function.

In one or more embodiments, the processor 1120 may perform operations described through FIGS. 12-17. However, this should not be considered as limiting.

The memory 1130 according to one or more embodiments may store instruction, control instruction code, control data, or user data for controlling the electronic device 100. For example, the memory 1130 may include applications, an operating system (OS), middleware, and various device drivers.

The memory 1130 according to one or more embodiments may include volatile memory and/or non-volatile memory. The volatile memory may include dynamic random access memory (DRAM), static RAM (SRAM), synchronous DRAM (SDRAM), phase-change RAM (PRAM), magnetic RAM (MRAM), resistive RAM (RRAM), ferroelectric RAM (ReRAM), or the like. The non-volatile memory may include read only memory (ROM), programmable ROM (PROM), electrically programmable ROM (EPROM), electrically erasable programmable ROM (EEPROM), flash memory, or the like.

The memory 1130 according to one or more embodiments may include a non-volatile medium such as a hard disk drive (HDD), a solid state disk (SSD), an embedded multi-media card (eMMC), a universal flash storage (UFS).

The display 160 according to one or more embodiments may output a content, data, or a signal. In various embodiments, the display 160 may display image data which is processed by the processor 1120.

According to one or more embodiments, the display 160 may be configured with an integrated touch screen by being coupled with a plurality of touch sensors (not shown), which may receive a touch input, etc. When the display 160 is configured with the touch screen, the plurality of touch sensors may be disposed over the display 160 or under the display 160, or may be integrally configured with the display 160. According to various embodiments, the display 160 may include a deformable display.

The camera 1140 according to one or more embodiments may include the first camera 214 and the second camera 414.

The sensor 1150 according to one or more embodiments may include various sensors for acquiring information from the outside. For example, the sensor 1150 may include an illumination sensor for acquiring illumination information around the electronic device 100, a biometric sensor (for example, a PPG sensor) for acquiring biometric information such as heartbeat information, or a fingerprint sensor for user authentication.

Figure 12:
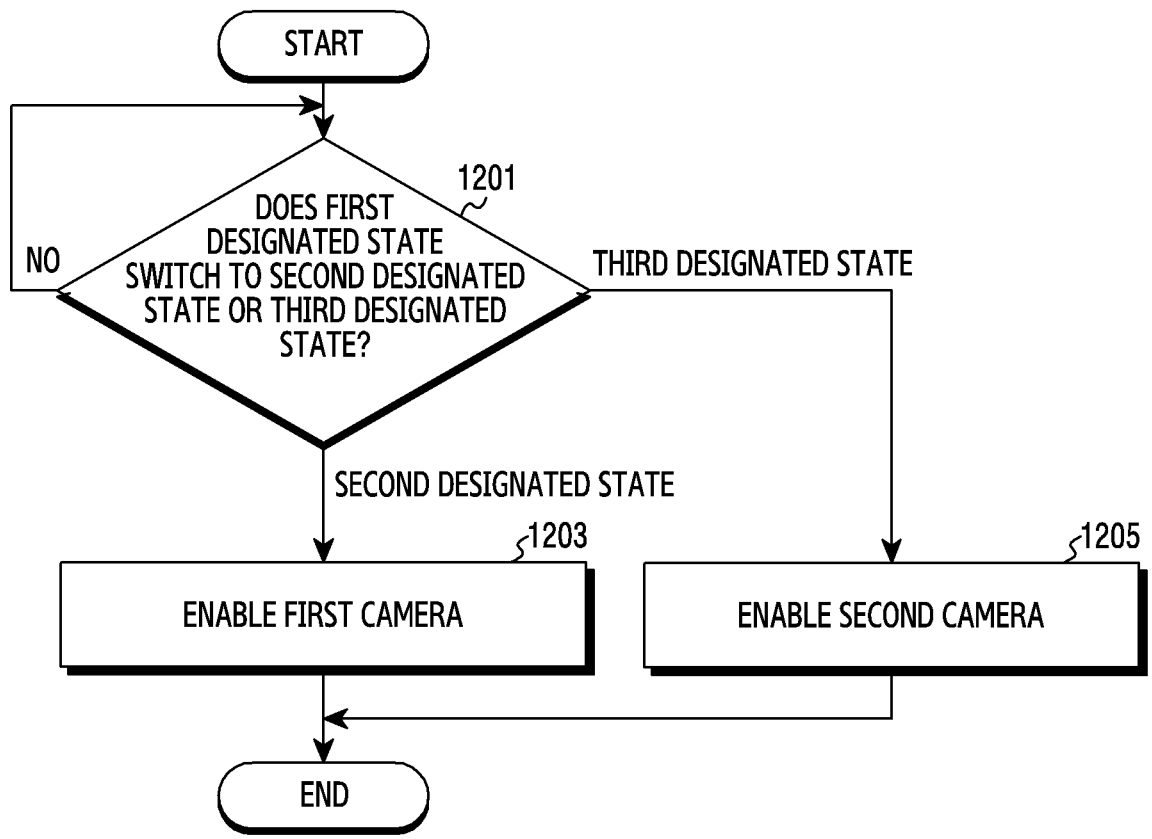
FIG. 12 is a flowchart illustrating a method for enabling a first camera or a second camera according to one or more embodiments.

FIG. 12 is a flowchart illustrating a method for enabling a first camera or a second camera according to one or more embodiments. This method may be executed by the electronic device 100 shown in FIGS. 1-11 or the processor 1120 of the electronic device 100.

In operation 1201 according to an embodiment, the processor 1120 may determine whether the electronic device 100 has switched from a first designated state to a second designated state or a third designated state. For example, the first designated state, the second designated state, and the third designated state may correspond to the first designated state, the second designated state, and the third designated state defined through the descriptions of FIGS. 1-10, respectively. For example, the processor 1120 may identify whether the first designated state of the electronic device 100 switches to the second designated state or the third designated state in order to select which of the first camera 214 or the second camera 414 to enable or disable. The processor 1120 may maintain the operation of identifying whether the electronic device 100 switches from the first designated state to the second designated state or the third designated state, while identifying that the first designated state of the electronic device 100 is maintained. The processor 1120 may perform operation 1203 based on it being identified that the electronic device 100 has switched from the first designated state to the second designated state. The processor 1120 may perform operation 1205 based on it being identified that the electronic device 100 has switched from the first designated state to the third designated state.

When the first designated state switches to the second designated state, the processor 1120 may enable the first camera 214 in operation 1203 according to an embodiment. For example, since switching from the first designated state to the second designated state may mean that the intent of the user of the electronic device 100 is to use the first camera 214, the processor 1120 may enable the first camera 214 when the first designated state switches to the second designated state. For example, when the electronic device 100 provides a locking state in the first designated state, the processor 1120 may maintain the locking state independently from the enabling of the first camera 214. For example, the locking state may refer to a state in which functionality of the electronic device is limited only by executing some of functions supportable by the electronic device 100. For example, some of the functions may include a camera function. For example, when the first designated state switches to the second designated state, the processor 1120 may execute a camera application in the electronic device 100, may enable the first camera 214 by applying power to the first camera 214, and may display a preview image within a user interface of the executed camera application, based at least in part on images acquired by using the first camera 214. However, this should not be considered as limiting.

When the first designated state switches to the third designated state, the processor 1120 may enable the second camera 414 in operation 1205 according to an embodiment. For example, since switching from the first designated state to the third designated state may mean that the intent of the user of the electronic device 100 is to use the second camera 414, the processor 1120 may enable the second camera 414 when the first designated state switches to the third designated state. For example, when the electronic device 100 provides the locking state in the first designated state, the processor 1120 may maintain the locking state independently from the enabling of the second camera 414. For example, when the first designated state switches to the third designated state, the processor 120 may execute the camera application in the electronic device 100, may enable the second camera 414 by applying power to the second camera 414, and may display a preview image within the user interface of the executed camera application, based at least in part on images acquired by using the second camera 414.

As described above, when the front plate 110 slides in the first designated state, the electronic device 100 according to one or more embodiments may enable the first camera 214 and the second camera 414 without an explicit user input for enabling the first camera 214 or the second camera 414, such that enhanced user experience can be provided. When the front plate 110 slides in the first designated state, the electronic device 100 according to one or more embodiments may execute the camera application without an explicit user input for executing the camera application, such that enhanced user experience can be provided.

Figure 13:
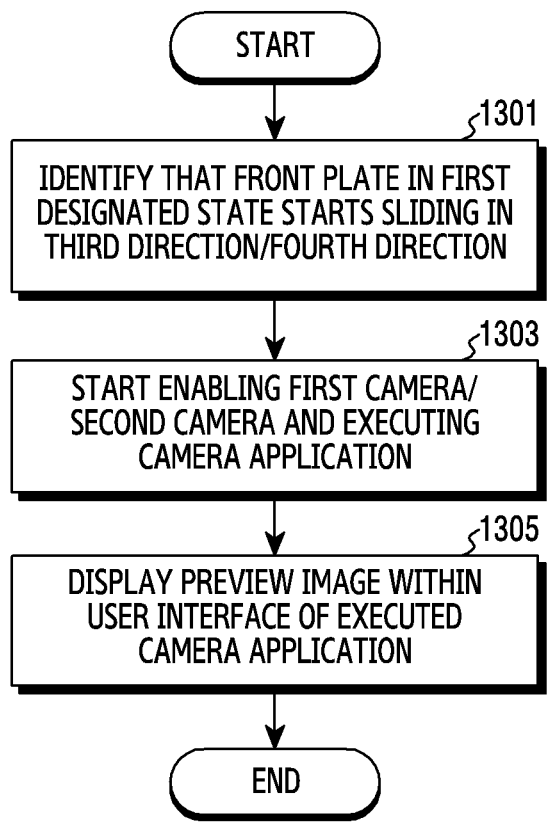
FIG. 13 is a flowchart illustrating a method for completing enabling of a camera and execution of a camera application before the first designated state switches to the second designated state or the third designated state according to one or more embodiments.

FIG. 13 is a flowchart illustrating a method for completing enabling of the camera and execution of the camera application before the first designated state switches to the second designated state or the third designated state according to one or more embodiments. This method may be executed by the electronic device 100 shown in FIGS. 1-11, or the processor 120 of the electronic device 100.

Referring to FIG. 13, in operation 1301 according to an embodiment, the processor 1120 may identify that the front plate 110 in the first designated state starts sliding in the third direction 702 or the fourth direction 902. For example, the processor 1120 may identify that the front plate 110 starts sliding in the third direction 702 or the fourth direction 902 by user's finger contacting the display 160. For example, the identification may be executed based on data acquired by a touch sensor of the display 160. For example, the identification may be executed through a sensor in the electronic device 100 for identifying the first designated state, the second designated state, and the third designated state. However, this should not be considered as limiting.

In operation 1303 according to an embodiment, the processor 1120 may start enabling the first camera 214 or the second camera 414 and executing the camera application in response to the identification. For example, in response to identifying that the front plate 110 in the first designated state starts sliding in the third direction 702, the processor 1120 may start enabling the first camera 214 and executing the camera application. In another example, in response to it being identified that the front plate 110 in the first designated state starts sliding in the fourth direction 902, the processor 1120 may start enabling the second camera 414 and executing the camera application. For example, in response to the identification, the processor 1120 may start enabling the first camera 214 or the second camera 414 and executing the camera application before the first designated state switches to the second designated state or the third designated state.

In operation 1305 according to an embodiment, the processor 1120 may display a preview image within the user interface of the executed camera application, based at least on images acquired through the first camera 214 or the second camera 414 enabled. For example, the preview image may be displayed after (or right after) the first designated state switches to the second designated state or the third designated state, or may be displayed before (or right before) the first designated state switches to the second designated state or the third designated state. This is because operations 1301 and 1303 are executed.

As described above, in response to it being identified that the intent of the user of the electronic device 100 is to use the first camera 214 or the second camera 414, the electronic device 100 according to one or more embodiments may start enabling the first camera 214 or the second camera 414 and executing the camera application, such that the enabling of the first camera 214 and the execution of the camera application can be provided at a fast response speed. In other words, the electronic device 100 according to one or more embodiments can provide more enhanced availability.

Figure 14:
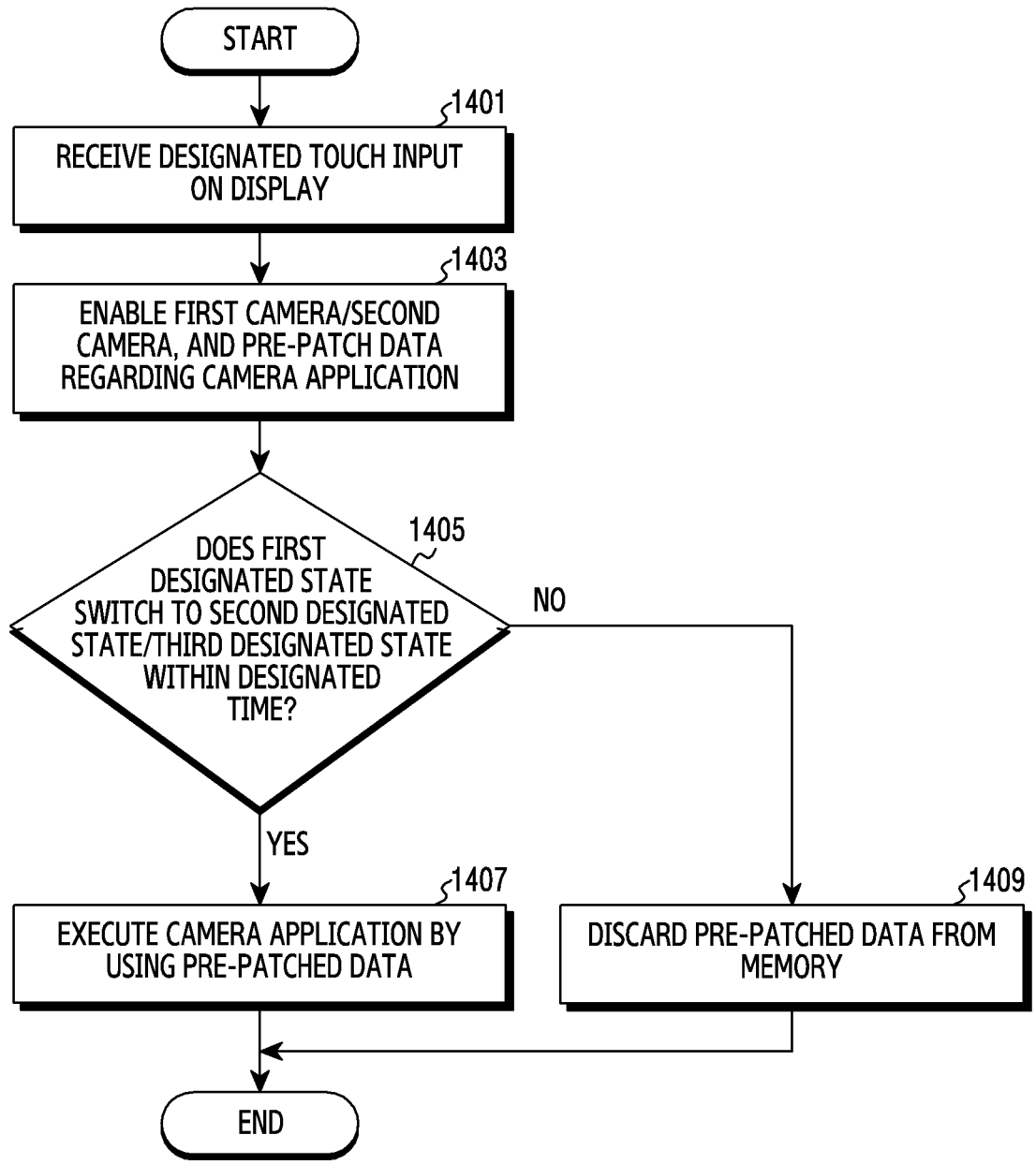
FIG. 14 is a flowchart illustrating a method for pre-patching data regarding a camera application according to one or more embodiments.

FIG. 14 is a flowchart illustrating a method for pre-patching data regarding a camera application according to one or more embodiments. This method may be executed by the electronic device 100 shown in FIGS. 1-11 or the processor 1120 of the electronic device 100.

Referring to FIG. 14, in operation 1401 according to an embodiment, the processor 1120 may receive a designated touch input on the display 160. For example, the designated touch input may be defined in the electronic device 100 to identify that the intent of the user is to slide the front plate 110 in the third direction 702 or the fourth direction 902. For example, the designated touch input may be user's thumb contacting the display 160. For example, the designated touch input may be identified based on not only data acquired from the touch sensor of the display 160, but also data acquired from a grip sensor.

In operation 1403 according to an embodiment, the processor 1120 may enable at least one of the first camera 214 or the second camera 414 in response to the designated touch input being received, and may pre-patch data regarding the camera application. For example, the processor 1120 may pre-patch a portion of data for executing the camera application in the memory 1130. Such pre-patching may be executed to reduce the execution speed of the camera application.

In operation 1405 according to an embodiment, while the data regarding the camera application is pre-patched in the memory 1130, the processor 1120 may identify whether the first designated state switches to the second designated state or the third designated state within a designated time. For example, the designated time may be defined in the electronic device 100 to identify whether the designated touch input is received to slide the front plate 110 in the third direction 702 or the fourth direction 902. The processor 1120 may execute operation 1407 when the first designated state switches to the second designated state or the third designated state within the designated time, but otherwise, the processor 1120 may execute operation 1409.

In operation 1407 according to an embodiment, the processor 1120 may execute the camera application by using the pre-patched data, based on identifying that the first designated state switches to the second designated state or the third designated state within the designated time. Since the processor 1120 executes the camera application by using the pre-patched data, the processor 1120 can complete the execution of the camera application at a faster response speed than other electronic devices which execute the camera application after switching to the second designated state.

In operation 1409 according to an embodiment, the processor 1120 may discard the pre-patched data from the memory 1130, based on identifying that the first designated state has not switched to the second designated state or the third designated state within the designated time. Since not switching to the second designated state or the third designated state within the designated time may mean that the designated touch input is not the input for switching the first designated state to the second designated state or the third designated state, the processor 120 may discard the pre-patched data to reduce a load of the memory 1130.

As described above, the electronic device 100 according to one or more embodiments can execute the camera application at a fast response speed, based on pre-patching and monitoring of the designated touch input, and can enhance resource efficiency.

Figure 15:
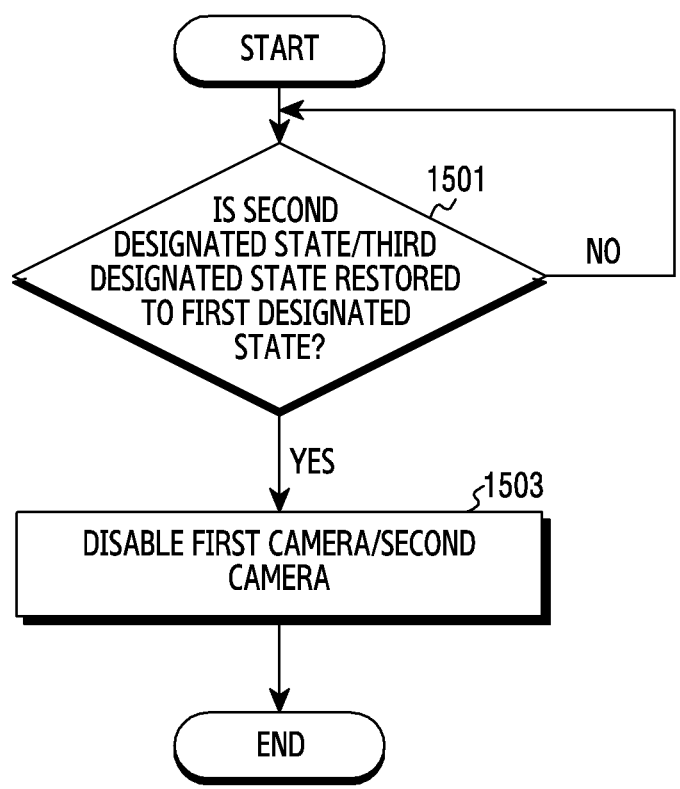
FIG. 15 is a flowchart illustrating a method for disabling the first camera or the second camera according to one or more embodiments.

FIG. 15 is a flowchart illustrating a method for disabling the first camera or the second camera according to one or more embodiments. This method may be executed by the electronic device 100 shown in FIGS. 1-11, or the processor 1120 of the electronic device 100.

Referring to FIG. 15, in operation 1501 according to an embodiment, the processor 1120 may identify whether the second designated state or the third designated state is restored to the first designated state. For example, the processor 1120 may perform operation 1503 when the second designated state or the third designated state is restored to the first designated state, but otherwise, the processor 1120 may maintain the identification of operation 1501.

In operation 1503 according to an embodiment, the processor 1120 may disable the first camera 214 or the second camera 414 in response to identifying that the second designated state or the third designated state is restored to the first designated state. For example, the processor 1120 may disable the enabled first camera 214, based on identifying that the front plate 110 in the second designated state slides by the first designated distance in the fourth direction 902 to restore the second designated state to the first designated state. For example, based on the identification, the processor 1120 may stop executing the camera application at the same time as disabling the first camera 214. In another example, the processor 1120 may disable the enabled second camera, based on identifying that the front plate 110 in the third designated state slides by the second designated distance in the third direction 702 to restore the third designated state to the first designated state. For example, based on the identification, the processor 1120 may stop executing the camera application at the same time as disabling the second camera 414.

As described above, the electronic device 100 according to one or more embodiments may disable the camera and may stop executing the camera application, based on sliding of the front plate 110, without an explicit user input for disabling the camera or an explicit user input for stopping executing the camera application, such that an enhanced user experience can be provided.

Figure 16:
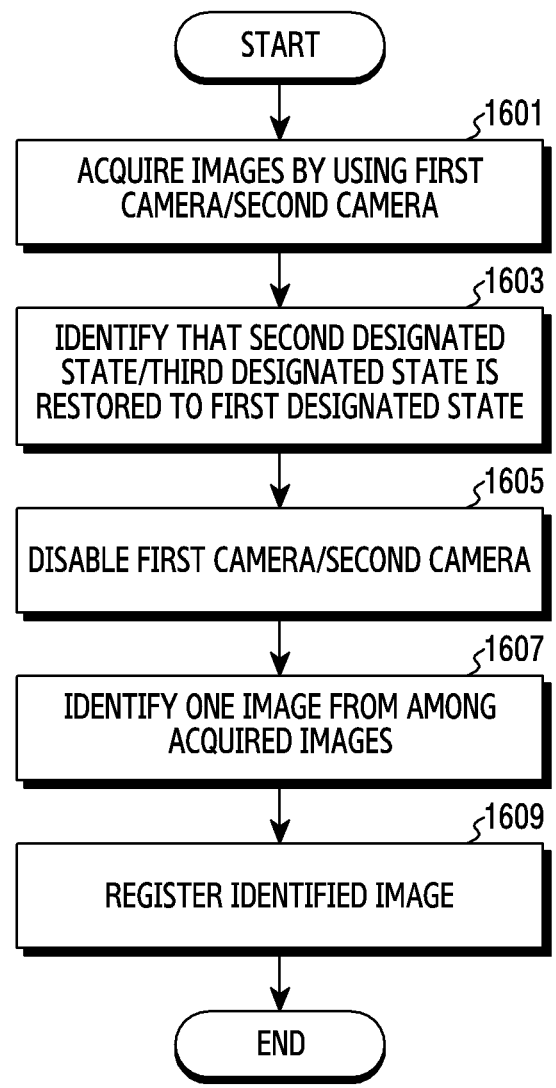
FIG. 16 is a flowchart illustrating a method for registering one image from among images acquired through a camera at a gallery application without an explicit input according to one or more embodiments.

FIG. 16 is a flowchart illustrating a method for registering one image from among images acquired through a camera in a gallery application without an explicit input according to one or more embodiments. This method may be executed by the electronic device 100 shown in FIGS. 1-11, or the processor 1120 of the electronic device 100.

Referring to FIG. 16, in operation 1601 according to an embodiment, the processor 1120 may acquire images by using the first camera 214 or the second camera 414. For example, the processor 1120 may acquire images by using the first camera 214 or the second camera 414 while the electronic device 100 is in the second designated state or the third designated state.

In operation 1603 according to an embodiment, the processor 1120 may identify that the second designated state or the third designated state is restored to the first designated state. For example, the processor 1120 may identify that the second designated state or the third designated state is restored to the first designated state, without receiving an input on a shooting icon or a photographing icon provided in the camera application. In another example, the processor 1120 may identify that the second designated state or the third designated state is restored to the first designated state, without registering the acquired images in the gallery application.

In operation 1605 according to an embodiment, the processor 1120 may disable the first camera 214 or the second camera 414 in response identifying that the first designated state is restored.

In operation 1607 according to an embodiment, the processor 1120 may identify one image from among the acquired images. For example, the acquired images may be images that are not registered in the gallery application. For example, the processor 1120 may execute image analysis with respect to the acquired images, and may identify an image having highest quality from among the acquired images as the image to be registered in the gallery application.

In operation 1609 according to an embodiment, the processor 1120 may register the identified image in the gallery application.

As described above, the electronic device 100 according to one or more embodiments may select an image to be registered in the gallery application based on sliding of the front plate 110, without an explicit user input for selecting a final image to be registered in the gallery application, such that an enhanced user experience can be provided.

Figure 17:
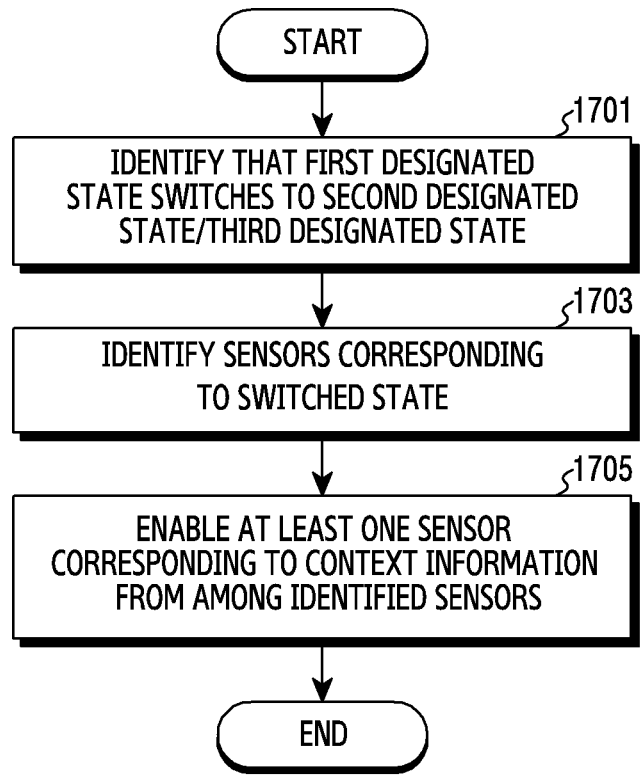
FIG. 17 is a flowchart illustrating a method for enabling at least one sensor from among sensors within the support member according to one or more embodiments.

FIG. 17 is a flowchart illustrating a method for enabling at least one sensor from among a plurality of sensors in the support member according to one or more embodiments. This method may be executed by the electronic device 100 shown in FIGS. 1-11 or the processor 1120 of the electronic device 100.

Referring to FIG. 17, in operation 1701 according to an embodiment, the processor 1120 may identify that the first designated state switches to the second designated state or the third designated state.

In operation 1703 according to an embodiment, the processor 1120 may identify sensors included in the support member 130 corresponding to the switched state. For example, when the first designated state switches to the second designated state, the processor 1120 may identify sensors included in the first surface of the support member 130 from among the plurality of sensors included in the support member 130. In another example, when the first designated state switches to the third designated state, the processor 1120 may identify sensors included in the second surface of the support member 130 from among the plurality of sensors included in the support member 130.

In operation 1705 according to an embodiment, the processor 1120 may enable at least one sensor corresponding to context information related to the electronic device 100 from among the identified sensors. For example, the processor 1120 may acquire the context information by using the sensors included in the electronic device 100. Context information may be at least one of the position of the electronic device 100, the moving speed of the electronic device 100, the orientation of the electronic device 100, the current time, ambient illumination of the electronic device 100, or a voice signal received in the electronic device 100, and may enable at least one sensor corresponding to the context information.

As described above, the electronic device 100 according to one or more embodiments may identify at least one sensor according to a sliding state of the front plate 110 without an explicit user input, such that complexity can be reduced and an enhanced user experience can be provided.

As described above, an electronic device according to one or more embodiments may include: a front plate facing a first direction and including a display; a rear plate facing a second direction opposite to the first direction; and a support member including a first camera facing the first direction and a second camera facing the second direction, and disposed between the front plate and the rear plate, and, when the front plate slides in a third direction with respect to the support member in a first state in which the first camera of the support member is occluded by the front plate and the second camera is occluded by the rear plate, the electronic device may be configured into a second state in which the first camera is visible, and, when the front plate slides in a fourth direction opposite to the third direction with respect to the rear plate in the first state, the support member may be configured to slide along with the front plate and the electronic device is configured into a third state in which the second camera is visible.

In one or more embodiments, while the front plate is sliding in the third direction with respect to the support member in the first state, a position of the support member may be fixed with respect to the rear plate, and the second camera may be occluded by the rear plate.

In one or more embodiments, while the front plate is sliding in the fourth direction with respect to the rear plate in the first state, a position of the support member may be fixed with respect to the front plate, and the first camera may be occluded by the front plate.

In one or more embodiments, the display may be visible through an entire area of the front plate.

In one or more embodiments, when the front plate slides in the fourth direction in the second state to restore the second state to the first state, the support member may be configured to maintain a fixed position with respect to the rear plate, such that the first camera is occluded by the front plate sliding in the fourth direction.

In one or more embodiments, when the front plate slides in the third direction in the third state to restore the third state to the first state, the support member may be configured to slide along with the front plate in the third direction with respect to the rear plate, such that the second camera is occluded by the rear plate.

In one or more embodiments, the support member may include at least one elastic member connected with the rear plate, and, when the front plate slides in the third direction in the first state, the support member may be configured to maintain a fixed position with respect to the rear plate, based on a first elastic force of the at least one elastic member in the fourth direction.

In one or more embodiments, the support member may include at least one guide hole, the front plate may include at least one protrusion configured to be movably inserted into the at least one guide hole, and, when the front plate slides in the fourth direction in the first state, the support member may be configured to slide along with the front plate in the fourth direction with respect to the rear plate, based on a force of the at least one protrusion of the sliding front plate pushing an end of the at least one guide hole in the fourth direction.

In one or more embodiments, the force of the at least one protrusion pushing the end of the at least one guide hole in the fourth direction may be greater than a second elastic force of the at least one elastic member in the third direction, caused by the sliding of the front plate in the fourth direction.

In one or more embodiments, the rear plate may include at least one guide member, and the front plate may include at least one guide path slidably connected with the at least one guide member to limit a sliding direction of the front plate in the third direction and the fourth direction.

In one or more embodiments, the rear plate may include at least one elastic protrusion, and the front plate may include at least one stopper which includes a first groove into which the at least one elastic protrusion is at least in part inserted in the first state, a second groove into which the at least one elastic protrusion is at least in part inserted in the second state, and a third groove into which the at least one elastic protrusion is at least in part inserted in the third state, the first groove may be disposed between the second groove and the third groove, and, when the front plate slides in the third direction to transition from the first state to the second state, the at least one elastic protrusion at least in part inserted into the first groove in the first state may slide from the first groove and may be at least in part inserted into the second groove, and, when the front plate slides in the fourth direction to transition from the first state to the third state, the at least one elastic protrusion may slide from the first groove and may be at least in part inserted into the third groove.

In one or more embodiments, the second groove in the at least one stopper may be spaced apart from the first groove in the at least one stopper by a first designated distance in order to limit a distance by which the front plate slides in the third direction in the first state to the first designated distance, and the third groove in the at least one stopper may be spaced apart from the first groove in the at least one stopper by a second designated distance in order to limit a distance by which the front plate slides in the fourth direction in the first state to the second designated distance.

In one or more embodiments, the rear plate may include a plurality of fixing members including a first fixing member and a second fixing member, the front plate may include a fixing member, the first fixing member may be disposed below the second fixing member, the fixing member of the front plate may be coupled with the first fixing member to maintain the second state, and may be coupled with the second fixing member to maintain the third state.

In one or more embodiments, each of the fixing member and the plurality of fixing members may be implemented with a magnet.

In one or more embodiments, the electronic device may include at least one processor, and the at least one processor may be configured to enable the first camera based on identifying that the front plate slides in the third direction in the first state, and to enable the second camera based on identifying that the front plate slides in the fourth direction in the first state.

In one or more embodiments, based on identifying that the front plate slides in the third direction in the first state, the at least one processor may be configured to enable the first camera, to execute a camera application installed in the electronic device, and to display a first preview image within a user interface of the camera application on the display by using at least some of images acquired through the first camera, and, based on identifying that the front plate slides in the fourth direction in the first state, the at least one processor may be configured to enable the second camera, to execute the camera application, and to display a second preview image within the user interface on the display by using at least some of images acquired through the second camera.

In one or more embodiments, the at least one processor may be configured to start enabling the first camera and executing the camera application, in response to identifying that the front plate in the first state starts sliding in the third direction, such that the enabling of the first camera and the executing of the camera application are completed before the electronic device is configured into the second state, and the at least one processor may be configured to start enabling the second camera and executing the camera application, in response to identifying that the front plate in the first state starts sliding in the fourth direction, such that the enabling of the second camera and the executing of the camera application are completed before the electronic device is configured into the third state.

In one or more embodiments, the at least one processor may further be configured to: disable the enabled first camera, based on identifying that the front plate slides in the fourth direction in the second state to restore the second state to the first state; and disable the enabled second camera, based on identifying that the front plate slides in the third direction in the third state to restore the third state to the first state.

In one or more embodiments, the at least one processor may be configured to: disable the enabled first camera and stop executing the camera application installed in the electronic device, based on identifying that the front plate slides in the fourth direction in the second state; and disable the enabled second camera and stop executing the camera application, based on identifying that the front plate slides in the third direction in the third state.

In one or more embodiments, the at least one processor may further be configured to: in response to identifying that the front plate slides in the fourth direction in the second state, identify a first image from among images that are acquired before the enabled first camera is disabled and are not registered in a gallery application installed in the electronic device, and register the first image in the gallery application; and, in response to identifying that the front plate slides in the third direction in the third state, identify a second image from among images that are acquired before the enabled second camera is disabled and are not registered in the gallery application, and register the second image in the gallery application.

The electronic device according to one or more embodiments may make at least one sensor visible or occluded by using the front plate slidable in two directions, such that a large screen with minimal bezels can be provided.

The effects achieved in the disclosure are not limited to that mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An electronic device comprising:
  a front plate facing a first direction and including a display;
  a rear plate facing a second direction opposite to the first direction and disposed to slide with the front plate; and
  a support member including a first camera facing the first direction and a second camera facing the second direction, and disposed between the front plate and the rear plate,
  wherein, when the front plate slides in a third direction with respect to the support member in a first state in which the first camera of the support member is occluded by the front plate and the second camera is occluded by the rear plate, the electronic device is configured into a second state in which the first camera is visible and the second camera is invisible,
  wherein, when the front plate slides in a fourth direction opposite to the third direction with respect to the rear plate in the first state, the support member is configured to slide along with the front plate and the electronic device is configured into a third state in which the first camera is invisible and the second camera is visible.

2. The electronic device of claim 1, wherein, while the front plate is sliding in the third direction with respect to the support member in the first state, a position of the support member is fixed with respect to the rear plate, and the second camera is occluded by the rear plate.

3. The electronic device of claim 1, wherein, while the front plate is sliding in the fourth direction with respect to the rear plate in the first state, a position of the support member is fixed with respect to the front plate, and the first camera is occluded by the front plate.

4. The electronic device of claim 1, wherein the display is visible through an entire area of the front plate.

5. The electronic device of claim 1, wherein, when the front plate slides in the fourth direction in the second state to restore the second state to the first state, the support member is configured to maintain a fixed position with respect to the rear plate, such that the first camera is occluded by the front plate sliding in the fourth direction.

6. The electronic device of claim 1, wherein, when the front plate slides in the third direction in the third state to restore the third state to the first state, the support member is configured to slide along with the front plate in the third direction with respect to the rear plate, such that the second camera is occluded by the rear plate.

7. The electronic device of claim 1, wherein the support member further comprises at least one elastic member connected with the rear plate, and wherein, when the front plate slides in the third direction in the first state, the support member is configured to maintain a fixed position with respect to the rear plate, based on a first elastic force of the at least one elastic member in the fourth direction.

8. The electronic device of claim 7, wherein the support member further comprises at least one guide hole,
wherein the front plate includes at least one protrusion configured to be movably inserted into the at least one guide hole, and
wherein, when the front plate slides in the fourth direction in the first state, the support member is configured to slide along with the front plate in the fourth direction with respect to the rear plate, based on a force of the at least one protrusion of the front plate pushing an end of the at least one guide hole in the fourth direction.

9. The electronic device of claim 8, wherein the force of the at least one protrusion pushing the end of the at least one guide hole in the fourth direction is greater than a second elastic force of the at least one elastic member in the third direction, caused by the front plate sliding in the fourth direction.

10. The electronic device of claim 1, wherein the rear plate further comprises at least one guide member, and
wherein the front plate further comprises at least one guide path slidably connected with the at least one guide member to limit a sliding direction of the front plate in the third direction and the fourth direction.

11. The electronic device of claim 1, wherein the rear plate further comprises at least one elastic protrusion,
wherein the front plate further comprises at least one stopper including a first groove into which the at least one elastic protrusion is at least in part inserted in the first state, a second groove into which the at least one elastic protrusion is at least in part inserted in the second state, and a third groove into which the at least one elastic protrusion is at least in part inserted in the third state,
wherein the first groove is disposed between the second groove and the third groove, and
wherein, when the front plate slides in the third direction to transition from the first state to the second state, the at least one elastic protrusion at least in part inserted into the first groove in the first state slides from the first groove and is at least in part inserted into the second groove, and, when the front plate slides in the fourth direction to transition from the first state to the third state, the at least one elastic protrusion slides from the first groove and is at least in part inserted into the third groove.

12. The electronic device of claim 11, wherein the second groove in the at least one stopper is spaced apart from the first groove in the at least one stopper by a first designated distance in order to limit a distance by which the front plate slides in the third direction in the first state to the first designated distance, and
wherein the third groove in the at least one stopper is spaced apart from the first groove in the at least one stopper by a second designated distance in order to limit a distance by which the front plate slides in the fourth direction in the first state to the second designated distance.

13. The electronic device of claim 1, wherein the rear plate further comprises a plurality of fixing members including a first fixing member and a second fixing member,
wherein the front plate further comprises a fixing member,
wherein the first fixing member is disposed below the second fixing member, and
wherein the fixing member of the front plate is coupled with the first fixing member to maintain the second state, and is coupled with the second fixing member to maintain the third state.

14. The electronic device of claim 13, wherein each of the fixing member and the plurality of fixing members is implemented with a magnet.

15. The electronic device of claim 1, wherein the electronic device further comprises at least one processor, and
wherein the at least one processor is configured to enable the first camera based on identifying that the front plate slides in the third direction in the first state, and to enable the second camera based on identifying that the front plate slides in the fourth direction in the first state.

16. The electronic device of claim 15, wherein, based on identifying that the front plate slides in the third direction in the first state, the at least one processor is further configured to enable the first camera, to execute a camera application installed in the electronic device, and to display a first preview image within a user interface of the camera application on the display by using at least some of images acquired through the first camera, and
wherein, based on identifying that the front plate slides in the fourth direction in the first state, the at least one processor is further configured to enable the second camera, to execute the camera application, and to display a second preview image within the user interface on the display by using at least some of images acquired through the second camera.

17. The electronic device of claim 16, wherein the at least one processor is further configured to start enabling the first camera and executing the camera application, in response to identifying that the front plate in the first state starts sliding in the third direction, such that enabling of the first camera and executing of the camera application are completed before the electronic device is configured into the second state, and
wherein the at least one processor is further configured to start enabling the second camera and executing the camera application, in response to identifying that the front plate in the first state starts sliding in the fourth direction, such that enabling of the second camera and executing of the camera application are completed before the electronic device is configured into the third state.

18. The electronic device of claim 15, wherein the at least one processor is further configured to:
disable the enabled first camera, based on identifying that the front plate slides in the fourth direction in the second state to restore the second state to the first state; and
disable the enabled second camera, based on identifying that the front plate slides in the third direction in the third state to restore the third state to the first state.

19. The electronic device of claim 15, wherein the at least one processor is further configured to:
disable the enabled first camera and stop executing a camera application installed in the electronic device, based on identifying that the front plate slides in the fourth direction in the second state; and
disable the enabled second camera and stop executing the camera application, based on identifying that the front plate slides in the third direction in the third state.

20. The electronic device of claim 15, wherein the at least one processor is further configured to:

in response to identifying that the front plate slides in the fourth direction in the second state, identify a first image from among images that are acquired before the enabled first camera is disabled and are not registered in a gallery application installed in the electronic device, and register the first image in the gallery application; and in response to identifying that the front plate slides in the third direction in the third state, identify a second image from among images that are acquired before the enabled second camera is disabled and are not registered in the gallery application, and register the second image in the gallery application.

* * * * *